(12) United States Patent
Newman

(10) Patent No.: US 11,958,078 B2
(45) **Date of Patent: *Apr. 16, 2024**

(54) SYSTEMS, APPARATUSES, AND METHODS FOR SECURING SCREEN ASSEMBLIES

(71) Applicant: DERRICK CORPORATION, Buffalo, NY (US)

(72) Inventor: Christian T. Newman, Lakeview, NY (US)

(73) Assignee: DERRICK CORPORATION, Buffalo, NY (US)

( * ) Notice: Subject to any disclaimer, the term of this patent is extended or adjusted under 35 U.S.C. 154(b) by 345 days.

This patent is subject to a terminal disclaimer.

(21) Appl. No.: 17/513,680

(22) Filed: Oct. 28, 2021

(65) Prior Publication Data

US 2022/0048075 A1 Feb. 17, 2022

Related U.S. Application Data

(63) Continuation of application No. 16/702,975, filed on Dec. 4, 2019, now Pat. No. 11,185,890, which is a continuation of application No. 15/953,476, filed on Apr. 15, 2018, now Pat. No. 10,512,939, which is a continuation of application No. 14/978,942, filed on Dec. 22, 2015, now Pat. No. 9,956,592.

(Continued)

(51) Int. Cl.
*B07B 1/48* (2006.01)
*B07B 1/46* (2006.01)

(52) U.S. Cl.
CPC ................ *B07B 1/485* (2013.01); *B07B 1/46* (2013.01); *B07B 1/4645* (2013.01); *B07B 1/48* (2013.01); *B07B 2201/02* (2013.01)

(58) Field of Classification Search
CPC ........... B07B 1/46; B07B 1/4645; B07B 1/48; B07B 1/485; B07B 2201/02
USPC .......................................................... 209/404
See application file for complete search history.

(56) References Cited

U.S. PATENT DOCUMENTS 9,956,592 B2 * 5/2018 Newman .................. B07B 1/46
10,512,939 B2 12/2019 Newman (Continued)

FOREIGN PATENT DOCUMENTS

AU 2015369585 B2 3/2019
AU 2019203679 B2 8/2021

(Continued)

*Primary Examiner* — Terrell H Matthews
(74) *Attorney, Agent, or Firm* — FisherBroyles, LLP; Jason P. Mueller

(57) ABSTRACT

Embodiments of the present disclosure provide for systems, apparatuses, and methods of securing screen assemblies. Embodiments include a system having a compression assembly with a compression pin and a pin assembly having a pin. The compression assembly may be attached to a first wall member of a vibratory screening machine and the pin assembly may be attached to a second wall member of the vibratory screening machine opposite the first wall member such that the compression assembly is configured to assert a force against a first side portion of a screen assembly and drive a second side portion of the screen assembly against the pin of the pin assembly. The pin assembly may include a pin that is internally or externally mounted and that is adjustable and/or replaceable.

24 Claims, 19 Drawing Sheets

Related U.S. Application Data

(60) Provisional application No. 62/096,330, filed on Dec. 23, 2014.

(56) References Cited

U.S. PATENT DOCUMENTS

| | | | | |
|---|---|---|---|---|
| 11,185,890 | B2 * | 11/2021 | Newman | B07B 1/48 |
| 2008/0029442 | A1 | 2/2008 | Schulte, Jr. | |
| 2016/0175888 | A1 * | 6/2016 | Newman | B07B 1/4645 29/446 |

FOREIGN PATENT DOCUMENTS

| | | | | | |
|---|---|---|---|---|---|
| AU | 2021212168 | B2 * | 2/2023 | B07B 1/46 |
| CN | 201669217 | U | 12/2010 | |
| CN | 203599051 | U | 5/2014 | |
| CN | 107107118 | B | 3/2021 | |
| JP | 2019048127 | A * | 3/2019 | A61M 1/1524 |
| WO | 2008115673 | | 9/2008 | |
| WO | 2014062164 | A1 | 4/2014 | |

* cited by examiner

SYSTEMS, APPARATUSES, AND METHODS FOR SECURING SCREEN ASSEMBLIES

This application is a continuation of U.S. patent application Ser. No. 16/702,975, filed on Dec. 4, 2019, which is a continuation of U.S. patent application Ser. No. 15/953,476, filed on Apr. 15, 2018, now U.S. Pat. No. 10,512,939, which is a continuation of U.S. patent application Ser. No. 14/978,942, filed on Dec. 22, 2015, now U.S. Pat. No. 9,956,592, which claims the benefit of U.S. Provisional Patent Application No. 62/096,330, filed on Dec. 23, 2014, the entire contents of each of the above-referenced applications are incorporated herein by reference.

DESCRIPTION OF EMBODIMENTS

Figure 1:
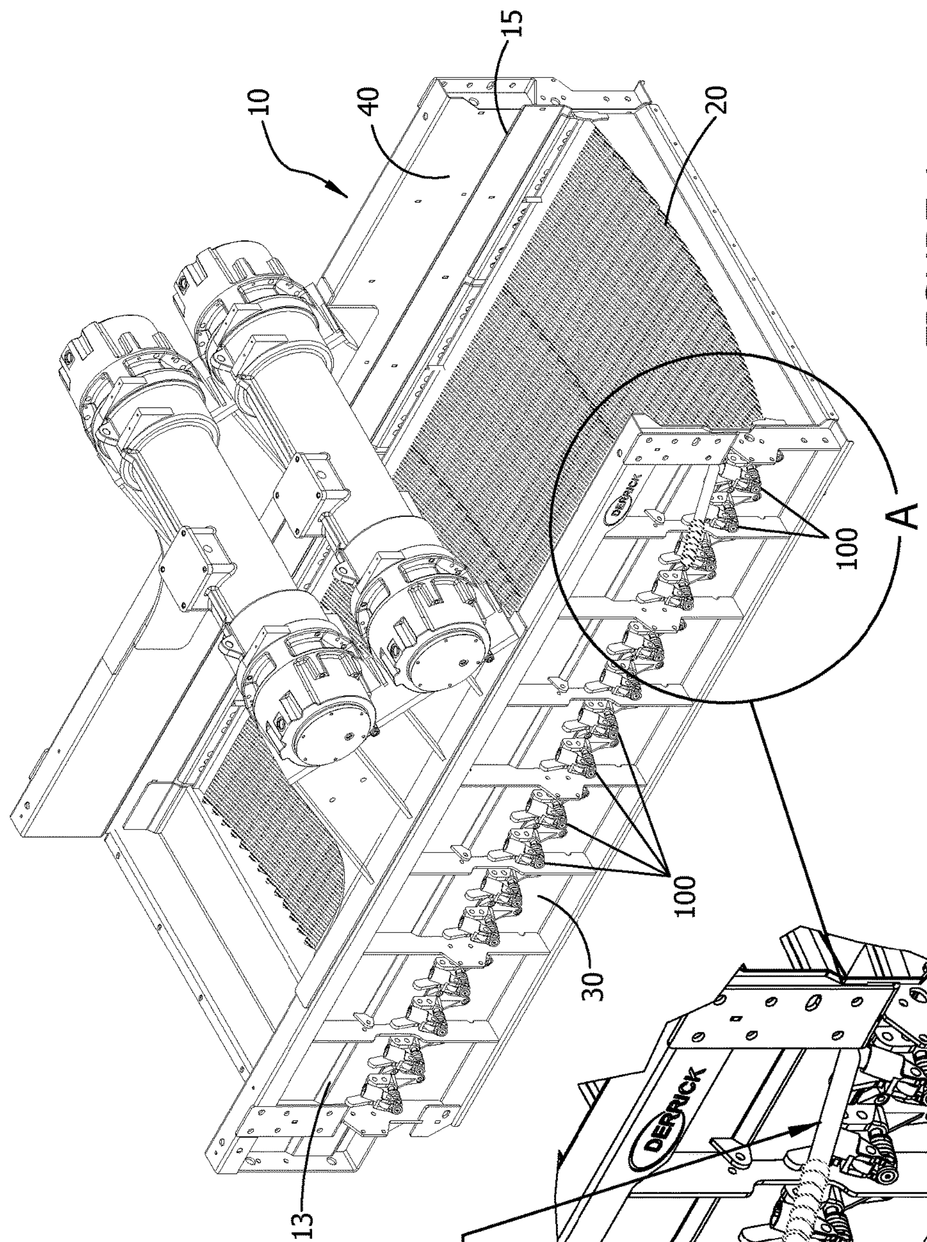
FIG. 1 is an isometric view of a vibratory screening machine, according to an exemplary embodiment of the present disclosure.

Material screening includes the use of vibratory screening machines. Vibratory screening machines provide the capability to excite an installed screen such that materials placed upon the screen may be separated to a desired level. Oversized materials are separated from undersized materials. Over time, screens wear and require replacement. As such, screens are designed to be replaceable.

Vibratory screening machines are generally under substantial vibratory forces and transfer the vibratory forces to screens and screen assemblies to shake them. Screens and/or screen assemblies must be securely attached to the vibratory screening machines to ensure that the forces are transferred and that the screen or screen assembly does not detach from the vibratory screening machine. Various approaches may be utilized to secure a screen or assembly to a vibratory screening machine, including clamping, tension mounting, etc.

One approach is to place the screen or assembly under compression to hold the screen or the assembly in place. The screen or assembly may be placed into the vibratory screening machine such that one side abuts a portion of the vibratory screening machine and an opposing side faces a compression assembly. The compression assembly may then be used to apply compression forces to the screen or assembly. Application of this compression force may also deflect the screen or screen assembly into a desired shape such as a concave shape. Compression assemblies may be power driven or manual.

The high compression forces typically required to secure a screen or assembly to a vibratory screening machine tend to make manual compression assemblies difficult to activate. There is also potential danger associated with the stored energy associated with springs that are compressed when the compression assembly is engaged. Typically, manual compression assemblies also do not allow for the amount of compression to be adjusted.

Embodiments of the present disclosure relate to systems, apparatuses, and methods of securing screen assemblies, and in particular though non-limiting embodiments, to systems, apparatuses, and methods of securing a screen assembly to a vibratory screening machine using a compression assembly.

Embodiments of the present disclosure provide a compression assembly that may be used to compression mount screens and/or screen assemblies to a vibratory screening machine. Compression assembly of the present disclosure may include any suitable compression mechanisms, including manually and/or hydraulically driven members. Embodiments of the present disclosure provide a manual compression assembly having a single compression pin. Embodiments of the present disclosure may be combined such that a plurality of compression assemblies apply compression force to a single screen or screen assembly. Compression assemblies of the present disclosure may be configured to be attached to a vibratory screening machine. Embodiments of the present disclosure may include replaceable pin assemblies and/or adjustment pin assemblies that allow for the amount of compression force applied by a compression assembly to be adjusted. Embodiments of the present disclosure may include a plurality of compression assemblies and a plurality of replaceable pin assemblies and/or adjustment pin assemblies attached to a vibratory screening machine.

Embodiments of the present disclosure provide a separate compression assembly for each compression pin of a vibratory screening machine. Separate assemblies for each compression pin may allow the energy required to apply compression to be dispersed over multiple assemblies. The compression assembly may have a detachable handle. A single handle may be used to activate multiple assemblies. Compression assemblies may be attached along a first and/or second wall of a vibratory screening machine. Compression assemblies may be attached to a vibratory screening machine such that four compression assemblies are configured to engage each screen and/or screen assembly installed in the vibratory screening machine. By using multiple assemblies for a single screen or screen assembly, the spring force of each compression assembly may be increased while the energy required to activate a single assembly is reduced.

Embodiments of the present disclosure provide a compression assembly having a single locked position rather than a ratcheting lock. While ratcheting lock assemblies may be used with embodiments of the present disclosure, providing a single locking/locked position allows an installer to ensure that a screen or screen assembly is fully installed and locked into place, eliminating uncertainty of potentially loose installations with a ratcheting assembly. Compression assemblies of the present disclosure may be retrofitted onto existing vibratory screening machines.

Embodiments of the present disclosure provide pin assemblies which may be attached to a vibratory screening machine along a wall opposing a wall having compression assemblies. Pin assemblies include pins configured to engage a side of a screen or screen assembly opposite a side of the screen or screen assembly receiving compression from compression assemblies. Pins may be adjustable or replaceable. Pins may be threaded and configured such that a portion of each pin protruding through a wall of a vibratory screening machine may be adjusted. Pins may be locked into place with a locking collar or sleeve. Pin assemblies may be used to adjust the amount of compression force on a screen or screen assembly. The screen or screen assembly may be placed under compression via compression assemblies of the present disclosure and the amount of compression may be adjusted via the pin assemblies. Pin assemblies may be adjusted during manufacture such that screens and/or screen assemblies are properly aligned when installed and placed under compression. For example, in embodiments of the present disclosure, a screen assembly may be placed on a vibratory screening machine, one side of the screen assembly may then be placed proximate to or against a pin or pins, the opposite side of the screen assembly may then be engaged by the compression assembly such that it drives the screen assembly against the pin or pins and secures it into place, and in certain embodiments, forms a top surface of the screen assembly into a concave shape. Combining the compression assemblies of the present disclosure with the pin assemblies of the present disclosure allows for the compression forces and/or screen deflection to be adjusted while permitting increased possible force per pin and a single locking location.

Embodiments also provide for easy replacement of pins. Damaged pins may be replaced or different sized pins may be inserted into the pin assemblies that allow for an increase or decrease in compression force and/or deflection on a screen mounted on the vibratory screening machine.

Although shown as pins, compression pin of compression assembly and/or pins of adjustable and/or replaceable pin assemblies may be a bar, rod, and/or another suitably shaped instrumentality for use in embodiments of the present disclosure.

Embodiments of the present disclosure may be utilized with vibratory screening machines such as those disclosed in U.S. Pat. Nos. 7,578,394, 8,443,984, 9,027,760, 9,056,335, 9,144,825, 8,910,796, and 9,199,279, 8,439,203, and U.S. Patent Application Publication Nos. 2013/0220892, 2013/0313168, 2014/0262978, 2015/0151333, 2015/0151334, 2015/0041371, and U.S. patent application Ser. No. 14/882,211, all of which are expressly incorporated herein in their entirety by reference hereto. Although shown in FIGS. 1 to 4A as attached to vibratory screening machines having a single screening surface, compression assemblies and/or adjustment pin assemblies of the present disclosure may be utilized with any vibratory screening machine configured or configurable for compression installment of screens and/or screen assemblies, including the dual screening surface embodiments of the incorporated patent and application publications. Vibratory screening machines may include modified first and/or second wall members that bend out, which may help keep the walls straight. Bent first and second wall members may increase the amount of force that first and second walls can withstand when a screen or screen assembly is placed under compression.

Figure 1A:
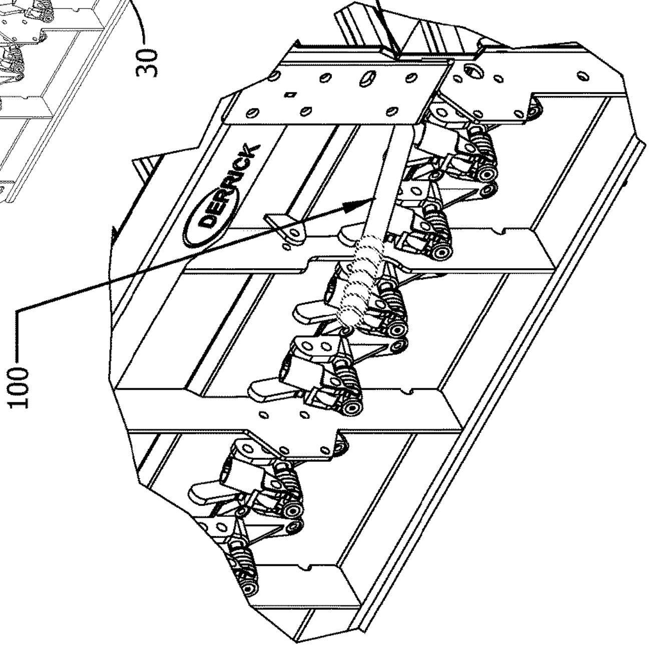
FIG. 1A is an enlarged view of Section A of the vibratory screening machine shown in FIG. 1.

Referring to FIGS. 1 and 1A, an example embodiment of a compression assembly 100 of the present disclosure is shown attached to a vibratory screening machine 10. A plurality of compression assemblies 100 are installed along first wall member 30 of vibratory screening machine 10. First wall member 30 and second wall member 40 have bent sections 13 and 15 respectively running the length of first wall member 30 and second wall member 40. Bent sections 13 and 15 may help to increase overall stability of first wall member 30 and second wall member 40 and prevent deflection when compression forces are applied to a screen or screen assembly 20.

Figure 3:
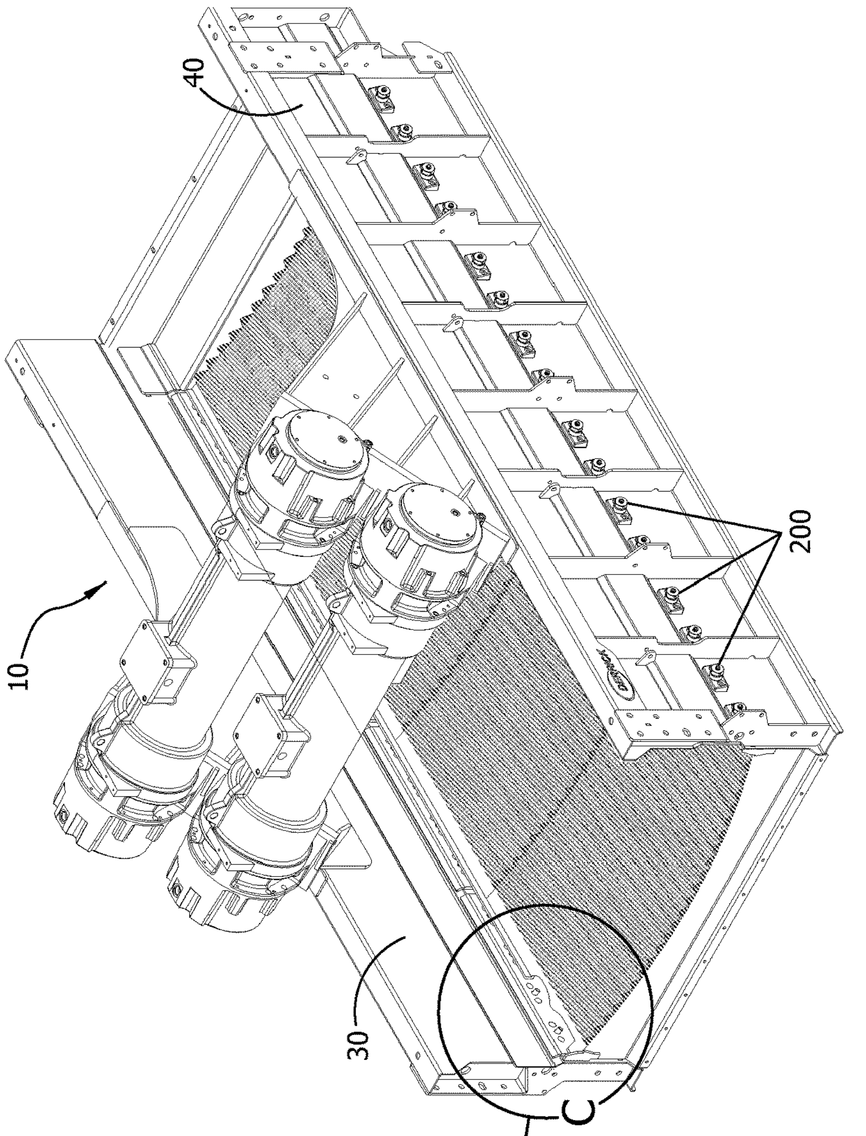
FIG. 3 is an isometric view of a vibratory screening machine with a portion of a screen assembly partially broken away showing a compression pin of a compression assembly, according to an exemplary embodiment of the present disclosure.
Figure 3A:
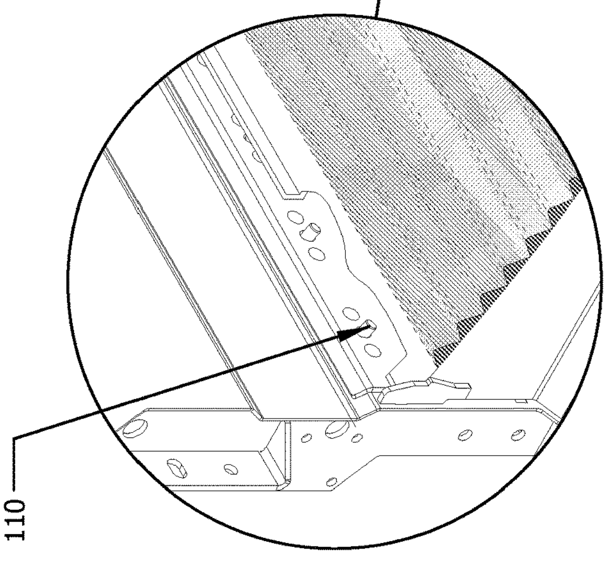
FIG. 3A is an enlarged view of Section C of the vibratory screening machine shown in FIG. 3.
Figure 4A:
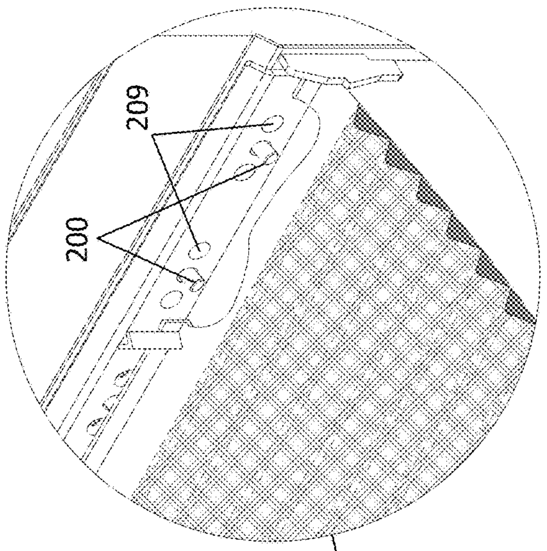
FIG. 4A is an enlarged view of Section D of the vibratory screening machine shown in FIG. 4.
Figure 4:
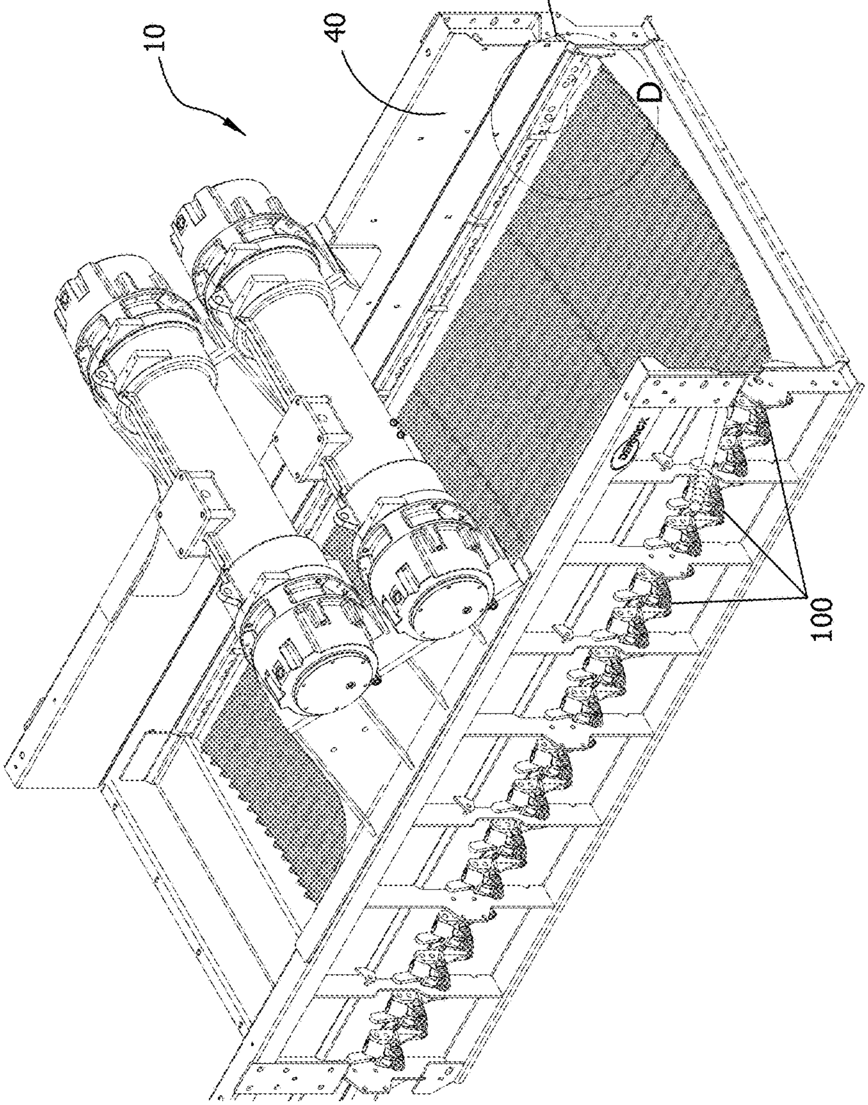
FIG. 4 is an isometric view of a vibratory screening machine with a portion of a screen assembly partially broken away showing an adjustment pin of an adjustment pin assembly, according to an exemplary embodiment of the present disclosure.

Installed in vibratory screening machine 10 is a plurality of screen assemblies 20. Screen assemblies 20 are placed under compression and deflected into a concave screening surface via the plurality of compression assemblies 100. As shown, each screen assembly 20 may be placed under compression by up to four separate compression assemblies 100. Vibratory screening machine 10 may be configured to have more or less than four compression assemblies 100 for each screen assembly 20. Each compression assembly 100 may be separately activated to apply compression, increasing the total compression force manually available while reducing the amount of energy necessary to activate a single compression assembly 100. As shown, the compression assemblies 100 are attached to first wall member 30; however, the compression assemblies 100 may be attached to second wall member 40. Compression assemblies 100 apply compression force via a compression pin 110 which protrudes through the wall member 30, 40 and engages a side of the screen assembly 20. See, e.g., FIGS. 3 and 3A. Each compression assembly 100 has a single compression pin 110. Additional compression pins 110 may be used. As compression assembly 100 is activated, compression pin 110 protrudes farther through the wall member 30, 40 to apply force against screen assembly 20.

Figure 2:
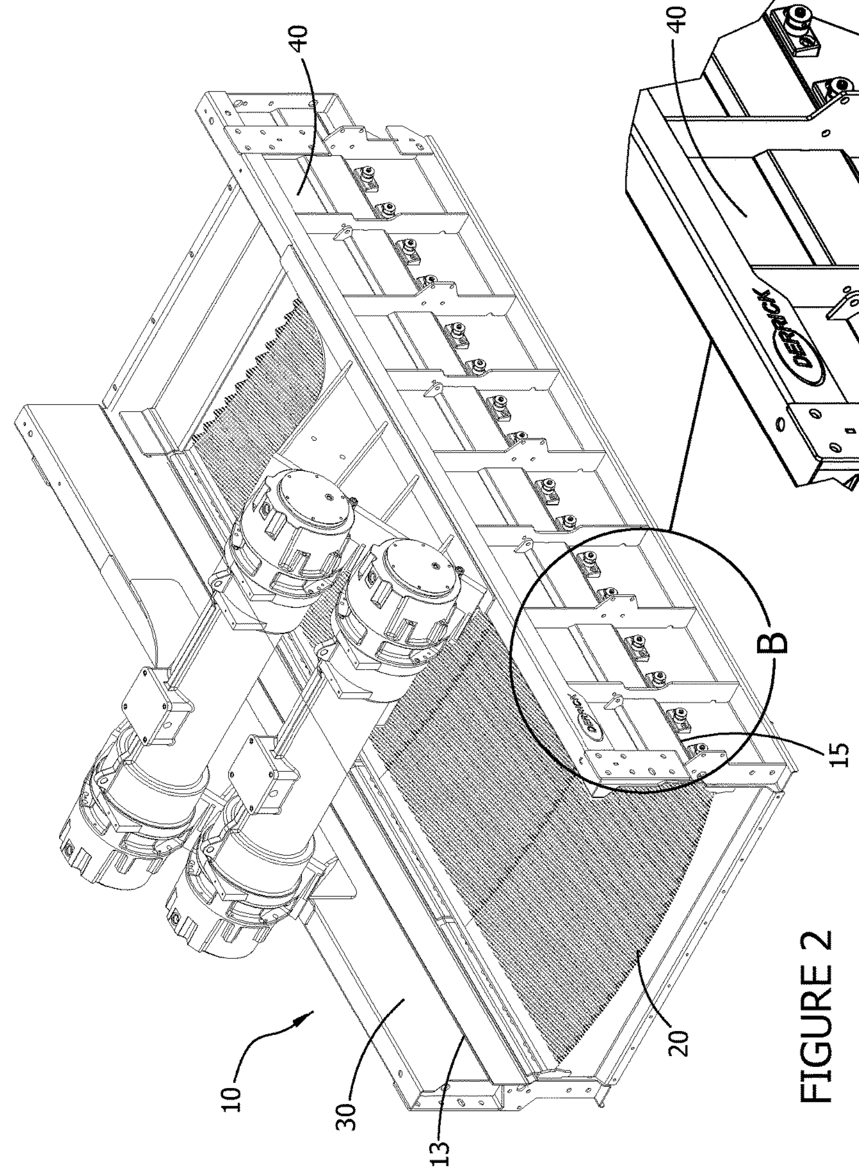
FIG. 2 is another isometric view of the vibratory screening machine shown in FIG. 1.
Figure 2A:
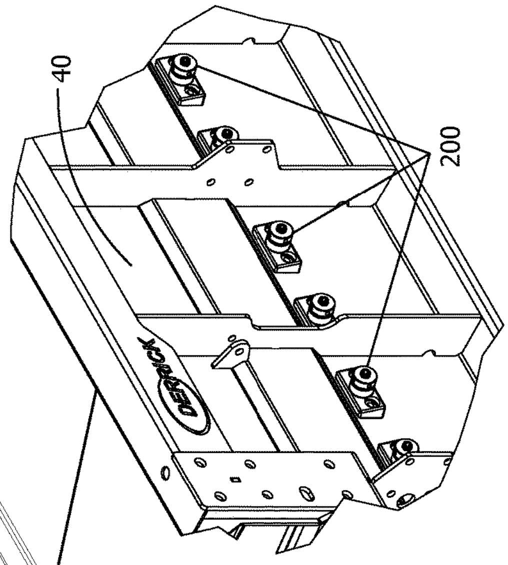
FIG. 2A is an enlarged view of Section B of the vibratory screening machine shown in FIG. 2.

FIGS. 2 and 2A show an example embodiment of an adjustment pin assembly 200 of the present disclosure attached to a vibratory screening machine 10. A plurality of adjustment pin assemblies 200 are attached to second wall member 40 of vibratory screening machine 10. Adjustment pin assemblies 200 may be attached to vibratory screening machine 10 to match compression assemblies 100 attached to first wall member 30 such that they are equal in number and aligned directly opposite each other. Adjustment pin assemblies 200 may be attached to either first wall member 30 or second wall member 40.

Adjustment pin assemblies 200 include adjustment pins 210 configured to protrude through a wall member 30, 40 and engage a side of screen assembly 20. See, e.g., FIGS. 4 and 4A. The amount of protrusion through the wall member 30, 40 may be adjusted allowing for the compression upon screen assembly 20 from compression assembly 100 to be adjusted.

Figure 5:
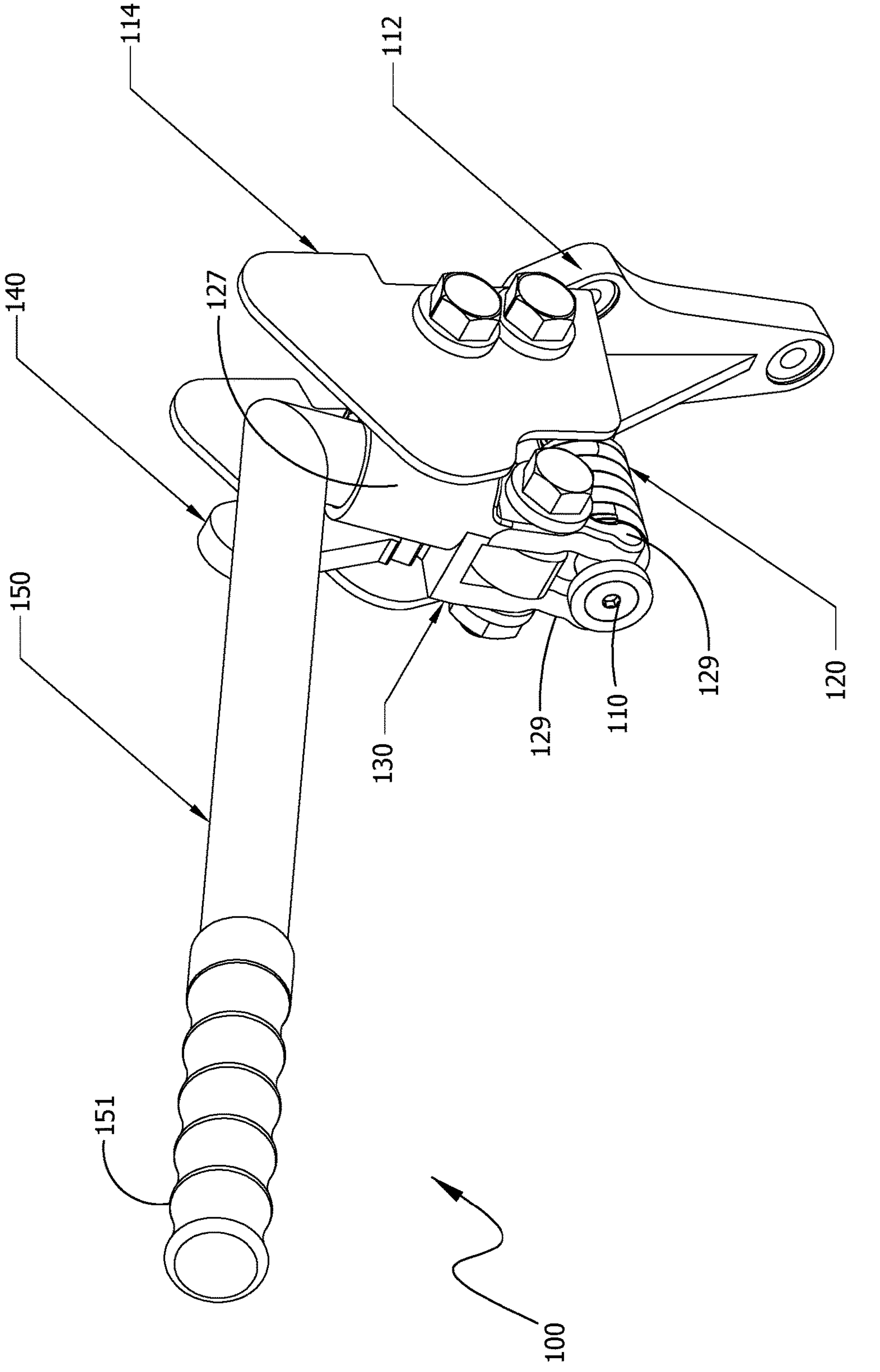
FIG. 5 is an isometric view of a compression assembly, according to an exemplary embodiment of the present disclosure.
Figure 5A:
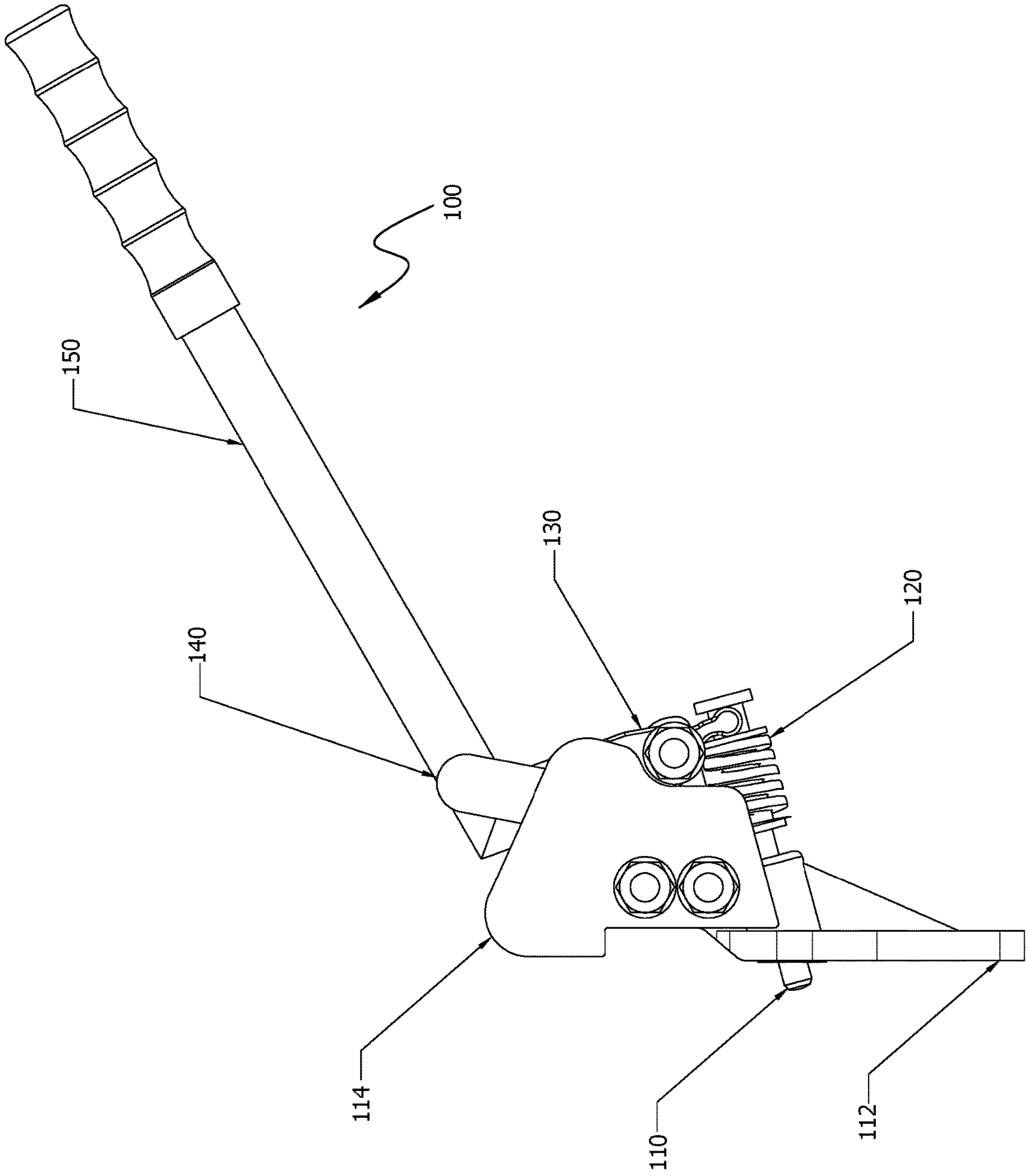
FIG. 5A is a side view of the compression assembly shown in FIG. 5.
Figure 6:
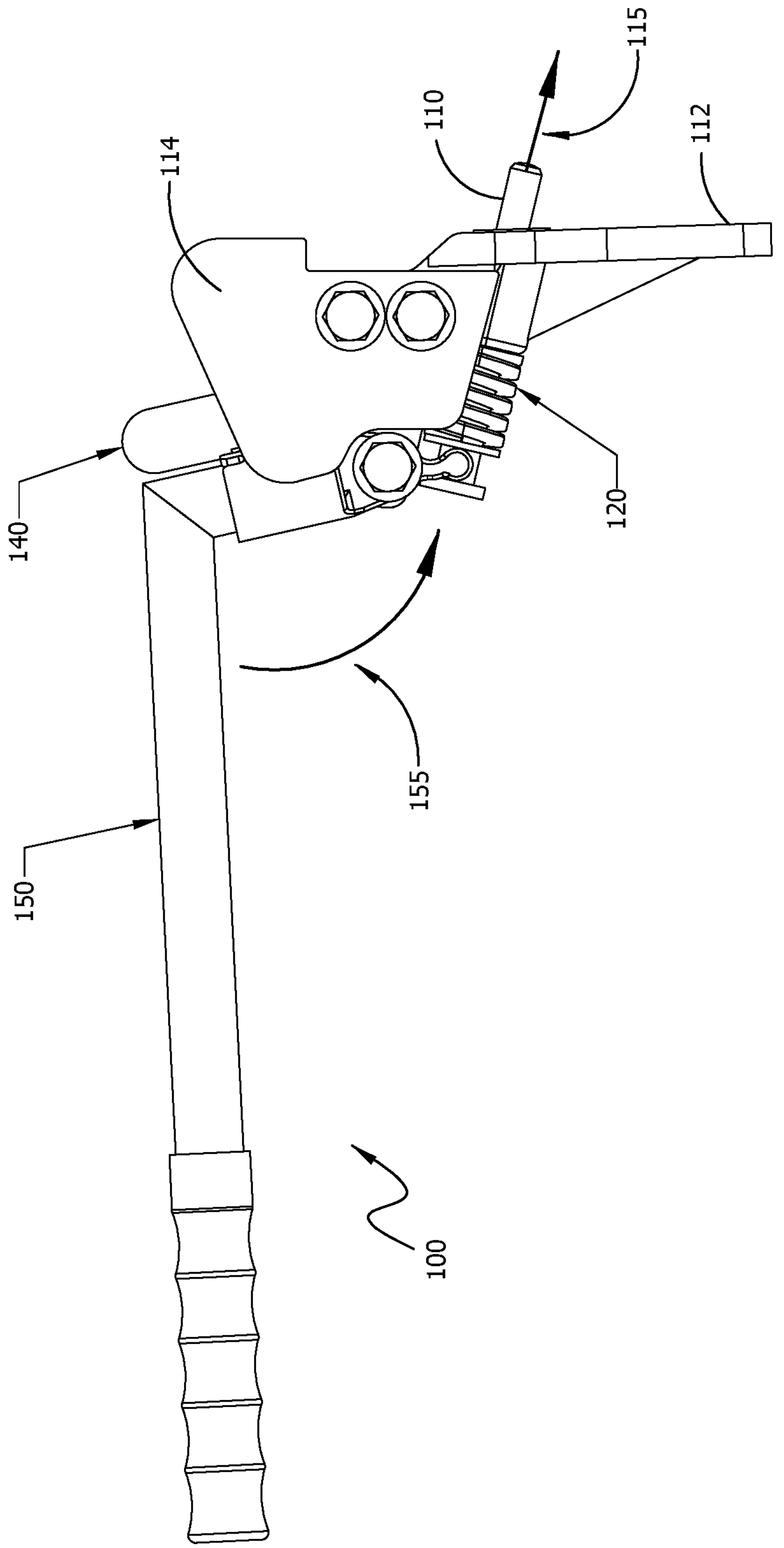
FIG. 6 is a side view of the compression assembly shown in FIG. 5 with the compression pin in an extended position.
Figures 6A, 6B:
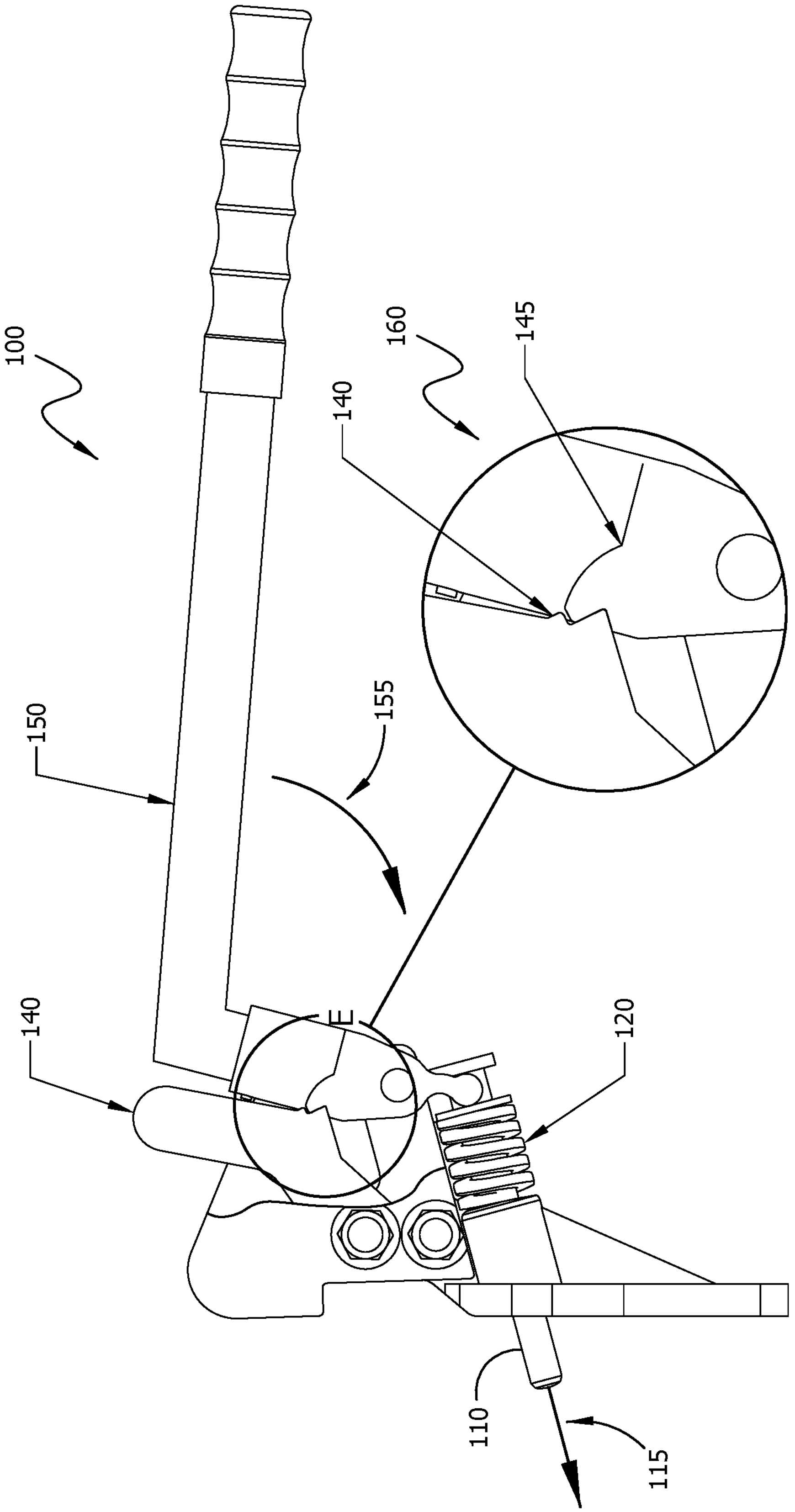
FIG. 6A is side view of a compression assembly with a portion of a pinch guard partially broken away, according to an exemplary embodiment of the present disclosure.
FIG. 6B is an enlarged view of Section E of the compression assembly shown in FIG. 6A.
Figure 9:
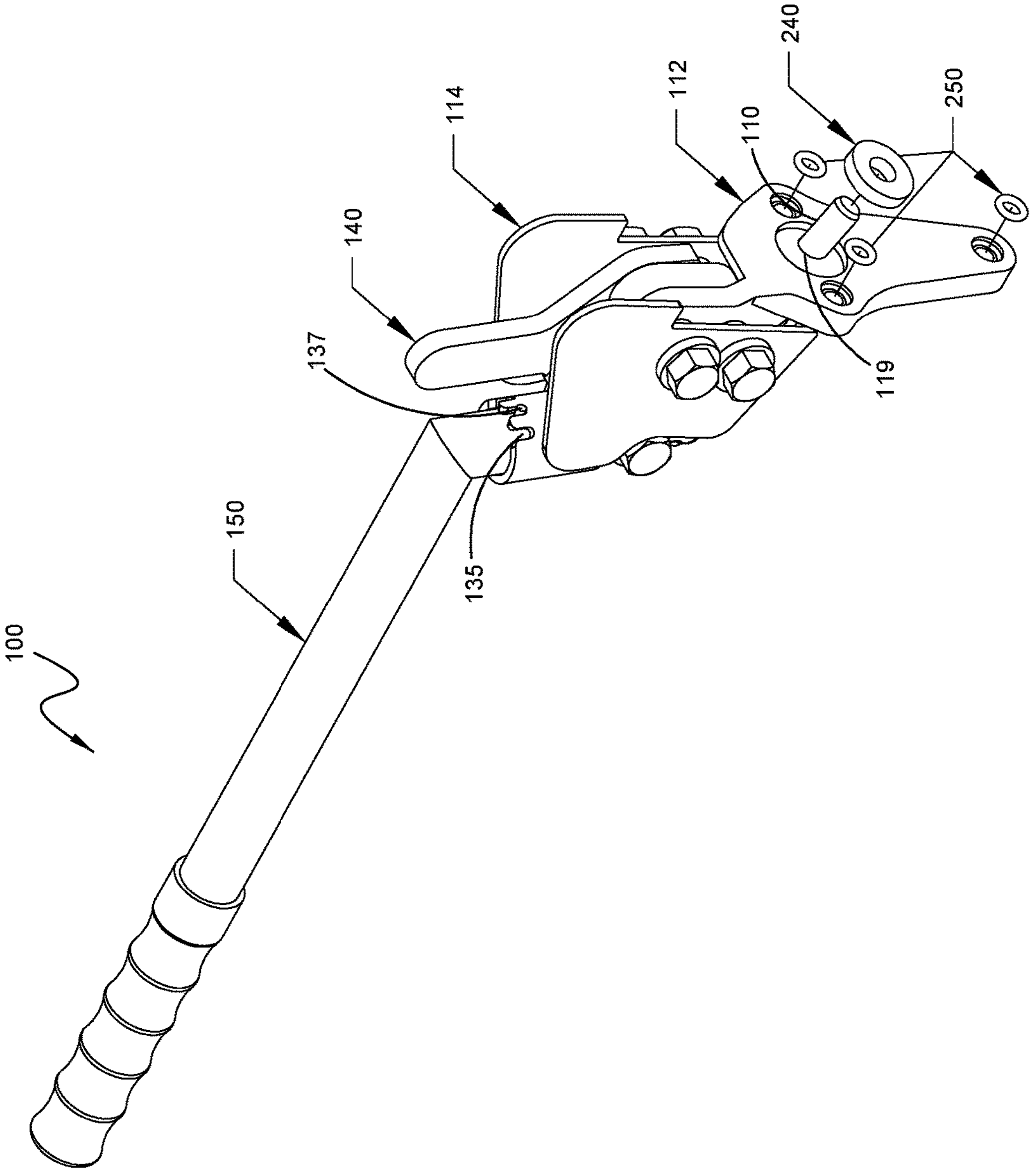
FIG. 9 is a partially exploded isometric view of a compression assembly, according to an exemplary embodiment of the present disclosure.

Referring to FIGS. 5 through 6B, an example embodiment of a compression assembly 100 is shown. Compression assembly 100 has compression mounting bracket 112 which is configured to attach to a vibratory screening machine 10. Compression mounting bracket 112 may be bolted to a wall member 30, 40 of a vibratory screening machine 10. In exemplary embodiments, compression mounting bracket 112 is bolted to first wall member 30. Compression mounting bracket 112 has compression pin aperture 119 allowing compression pin 110 to pass through. See, e.g., FIG. 9. Compression mounting bracket 112 may be mounted with O-rings 250 and seal washer 240 to ensure fluids do not pass through the wall member 30, 40 via compression assembly 100. Compression mounting bracket 112, O-rings 250, and seal washer 240 may all be flush with the wall member 30, 40 when mounted.

Actuator bracket 130 may be attached to compression mounting bracket 112. See, e.g., FIGS. 5 and 9. Attachment of actuator bracket 130 may be via a bolt connection such that actuator bracket 130 may rotate relative to the axis formed by the bolt connection. Although shown as a bolt connection, connection may be any secure connection between actuator bracket 130 and compression mounting bracket 112 allowing for rotation along the axis of the connection. Actuator bracket 130 attaches to compression pin 110 via extension members 129, which are secured to compression pin 110 just below pin head 110. Extension members 129 further contact compression spring 120, which is configured to push against extension members 129 and thereby push compression pin 110 away from a wall member 30, 40.

Actuator bracket 130 further includes sleeve 127, which is configured to receive a first end of a handle 150. Handle 150 may be configured with a bend (see, e.g., FIG. 5) and include a second end having a grip 151. Downward force 155 may be applied to handle 150 to compress compression spring 120 via extension members 129 and push compression pin 110 in direction 115 to increase protrusion of compression pin 110 through the wall member. See, e.g., FIG. 6. Compression assembly 100 may be locked into compression position 160 by engaging a locking latch 140 and locking pawl 145. See, e.g., FIGS. 6A and 6B. Locking latch 140 is attached to pinch guard 114 such that it may rotate along an axis formed by the connection with pinch guard 114. When downward force 155 is applied to handle 150, locking latch 140 falls until it engages pawl 145 in compression position 160. Compression assembly 100 may be released or unlocked by application of downward force 155 on handle 150 until locking latch 140 freely moves, lifting locking latch 140 so that actuator bracket 130 may rotate freely, reducing downward force 155 and releasing locking latch 140 once the actuator bracket 130 is no longer under sufficient compression to lock. Compression assemblies 100 of the present disclosure provide for quick installation and removal of screen assemblies with reduced energy requirements and increased total compression force.

Handle 150 may be detachably connected to sleeve 127 such that handle 150 may be used to activate and/or deactivate multiple compression assemblies 100. Sleeve 127 may include grooves 135 configured to engage locator pin 137 of handle 150. See, e.g., FIG. 9. Grooves 135 and locator pin 137 allow handle 150 to be sufficiently secure within sleeve 127 while maintaining the ability for quick detachment. Pinch guard 114 covers the internal portions of the compression assembly 100 to increase safety of operations. Pinch guard 114 prevents an operator's fingers from being caught between the locking latch 140 and actuator bracket 130.

Figure 7:
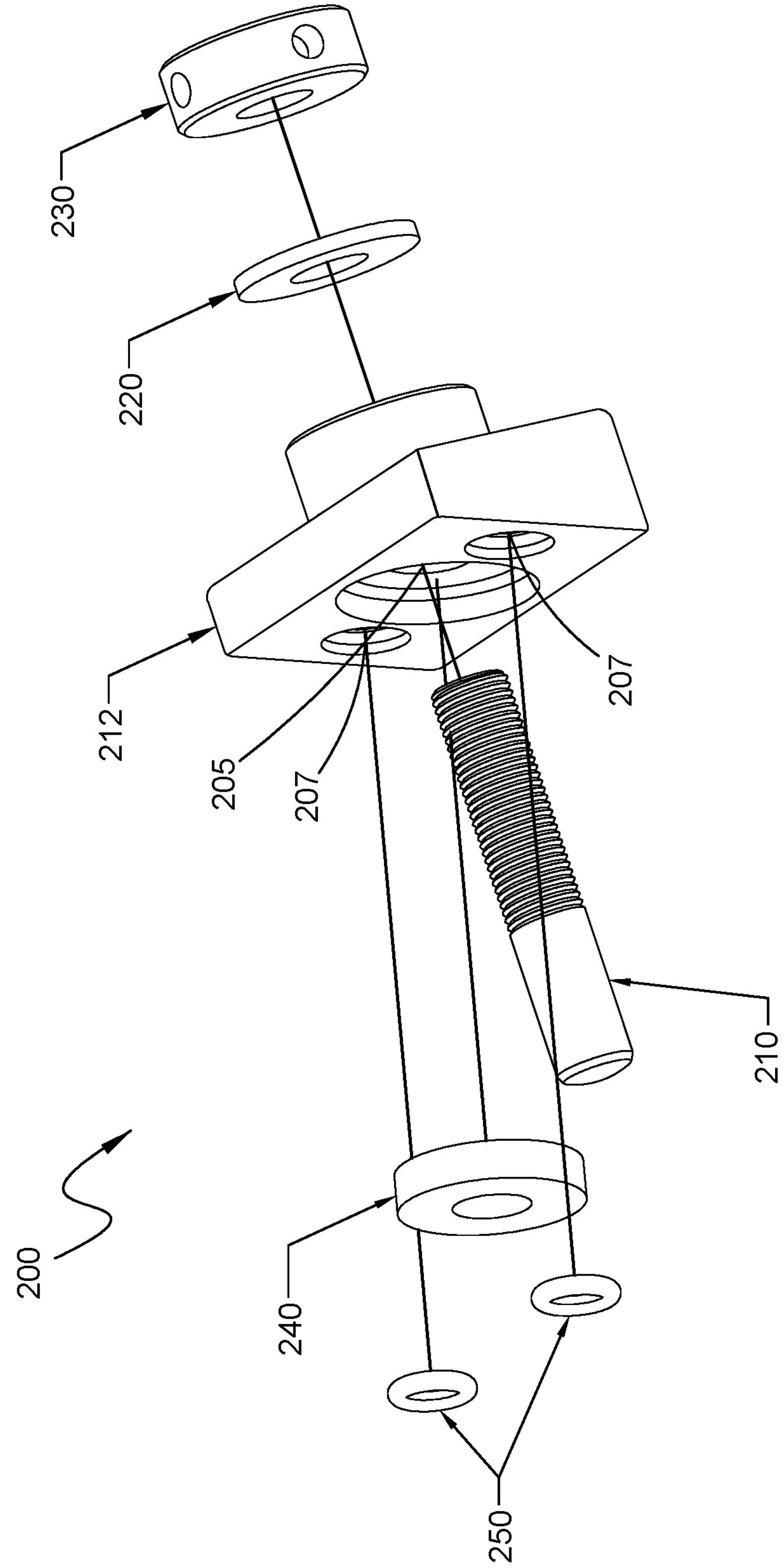
FIG. 7 is an exploded view of an adjustment pin assembly, according to an exemplary embodiment of the present disclosure.
Figure 8:
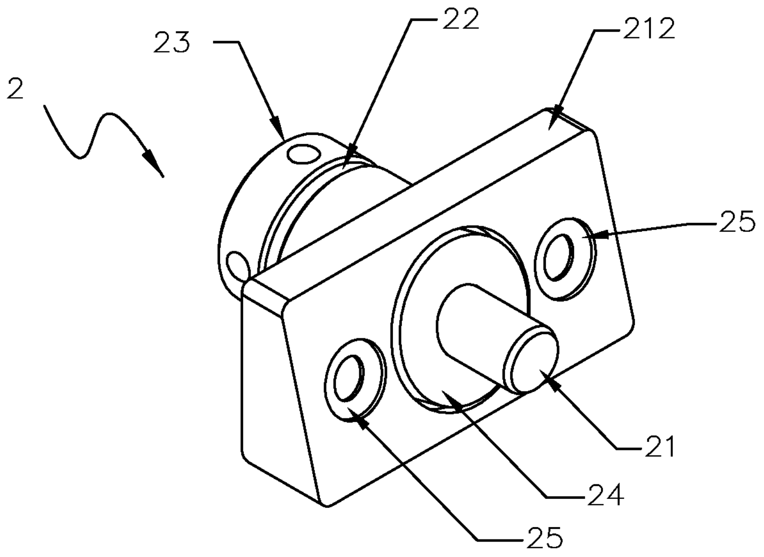
FIG. 8 is an isometric view of an adjustment pin assembly, according to an exemplary embodiment of the present disclosure.
Figure 8A:
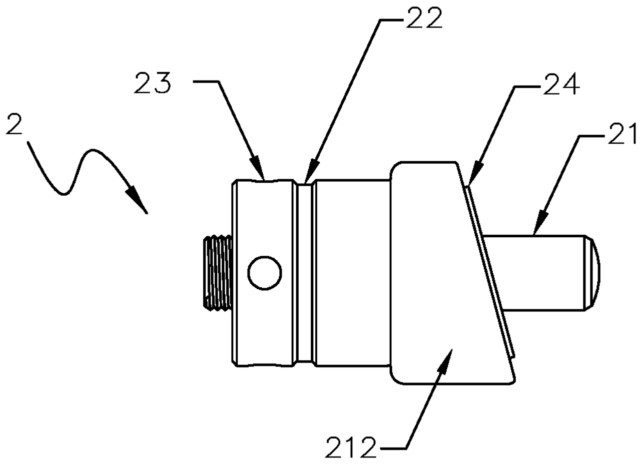
FIG. 8A is a side view of the adjustment pin assembly shown in FIG. 8.

FIGS. 7 to 8A show an example embodiment of an adjustment pin assembly 200. Adjustment pin assembly 200 has mounting block 212 which is configured to attach to a wall member 30, 40 of a vibratory screening machine 10. In an exemplary embodiment, mounting block 212 is attached to second wall member 40 of vibratory screening machine 10. Adjustment pin aperture 205 is located generally centrally and is configured to allow adjustment pin 210 to pass through mounting block 212. Mounting block 212 may be mounted with O-rings 250 and seal washer 240, which may all be flush with the wall member 30, 40 when mounted. Adjustment pin assembly 200 may be bolted to a vibratory screen assembly 20 via attachment to mounting apertures 207 of adjustment pin assembly 200 and vibratory screening machine 10, respectively.

One end of adjustment pin 210 may be threaded. See, e.g., FIG. 7. The threading of adjustment pin 210 is configured to match threading in pin aperture 205 and in locking collar 230. Between locking collar 230 and mounting bracket 212, spring washer 220 is disposed. The amount of protrusion of adjustment pin 210 may be adjusted by threading it through pin aperture 205 to increase or decrease protrusion until a desired level of protrusion is achieved. Once the desired level is achieved, adjustment pin 210 may be locked into place via locking collar 230. Each of a plurality of adjustment pin assemblies 200 may be separately adjusted to ensure proper protrusion of each adjustment pin 210.

Figure 10:
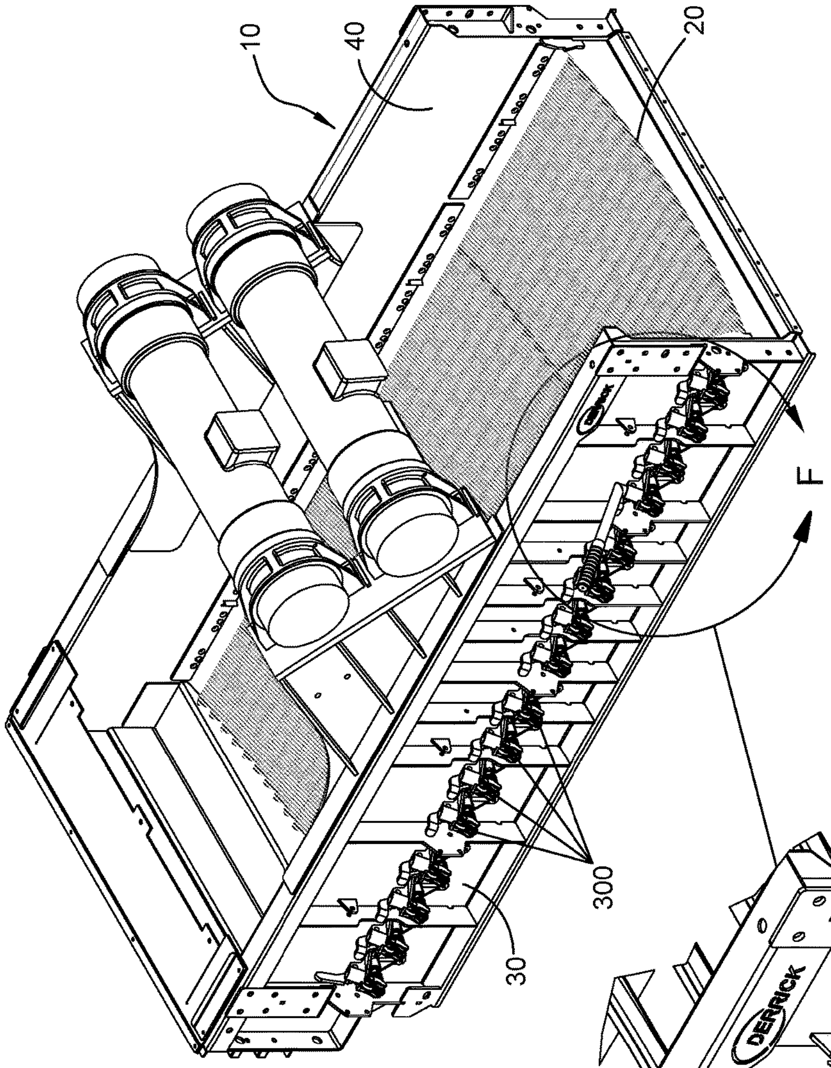
FIG. 10 is an isometric view of a vibratory screening machine, according to an exemplary embodiment of the present disclosure.
Figure 10A:
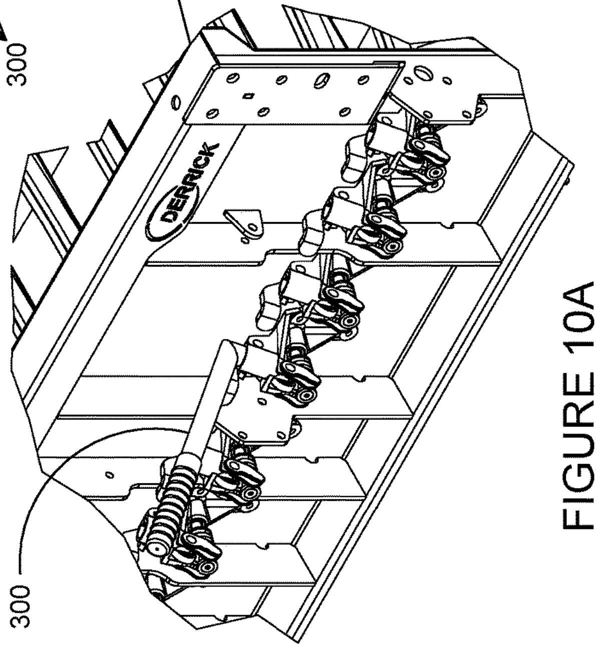
FIG. 10A is an enlarged view of Section F of the vibratory screening machine shown in FIG. 10.

Referring to FIGS. 10 and 10A, an alternative embodiment of a compression assembly 300 of the present disclosure is shown attached to a vibratory screening machine 10. A plurality of compression assemblies 300 are installed along first wall member 30 of vibratory screening machine

10. As shown, first wall member 30 and second wall member 40 do not have bent sections 13, 15 described herein running the length of first wall member 30 and second wall member 40. In alternative embodiments, first wall member 30 and second wall member 40 of the present disclosure may include bent sections 13, 15.

Installed in vibratory screening machine 10 is a plurality of screen assemblies 20. Screen assemblies 20 are placed under compression and deflected into a concave screening surface via the plurality of compression assemblies 300. Alternatively, screen assemblies that do not deflect substantially may be secured to a vibratory screening machine 10 using embodiments of the present disclosure. As shown, each screen assembly 20 may be placed under compression by up to four separate compression assemblies 300. Vibratory screening machine 10 may be configured to have more or less than four compression assemblies 300 for each screen assembly 20. Each compression assembly 300 may be separately activated to apply compression, increasing the total compression force manually available while reducing the amount of energy necessary to activate a single compression assembly 300. As shown, the compression assemblies 300 are attached to first wall member 30; however, the compression assemblies 300 may be attached to second wall member 40. Compression assemblies 300 apply compression force via a compression pin 310 which protrudes through first wall member 30 and engages a side of the screen assembly 20. See, e.g., FIGS. 11 and 13. Each compression assembly 300 has a single compression pin 310. Additional compression pins 310 may be used. As compression assembly 300 is activated, compression pin 310 protrudes farther through the first wall member 30 to apply force against screen assembly 20.

Figure 11:
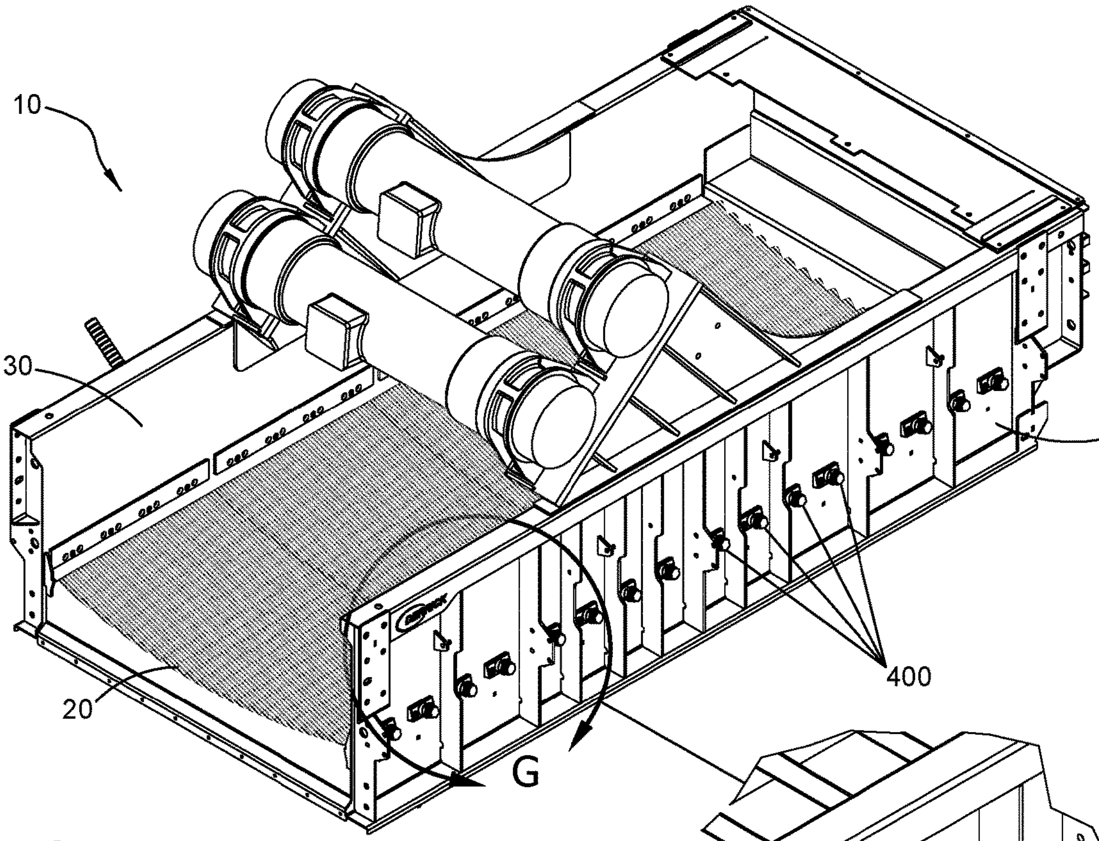
FIG. 11 is another isometric view of the vibratory screening machine shown in FIG. 10.
Figure 11A:
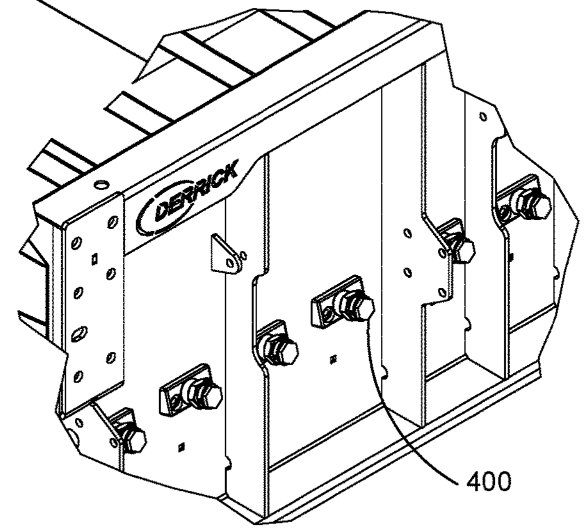
FIG. 11A is an enlarged view of Section G of the vibratory screening machine shown in FIG. 11.

FIGS. 11 and 11A show a removable pin assembly 400 attached to a vibratory screening machine 10. A plurality of removable pin assemblies 400 are attached to second wall member 40 of vibratory screening machine 10. Removable pin assemblies 400 may be attached to vibratory screening machine 10 to match compression assemblies 300 attached to first wall member 30 such that they are equal in number and aligned directly opposite each other. Removable pin assemblies 400 may be attached to either first wall member 30 or second wall member 40, opposite location of compression assemblies 300.

Removable pin assemblies 400 include removable and/or replaceable pins 410 configured to protrude through a wall member 30, 40 and engage a side of screen assembly 20. See, e.g., FIGS. 10 and 15. In exemplary embodiments, some components of the removable pin assembly 400 may be fixedly and/or permanently attached to a wall member 30, 40 of a vibratory screening machine 10, and the pin 410 may be inserted, removed, and/or replaced as needed. Embodiments of removable pin assembly 400 described herein allow for easy insertion and replacement of pins 410 due to accessibility of the pins 410 external to wall members 30, 40 of vibratory screening machine 10. Pins 410 may be easily replaceable when damaged. In some embodiments, pins 410 may be replaced with pins 410 having different geometries, e.g., longer or shorter pins 410 that result in larger or smaller, respectively, deflections of a screen assembly 20, or with pins 410 with different shaped faces that engage a portion of the screen assembly 20 and push it in a desired direction or at a desired angle or grip the screen assembly 20 or lock it in place.

Figure 12:
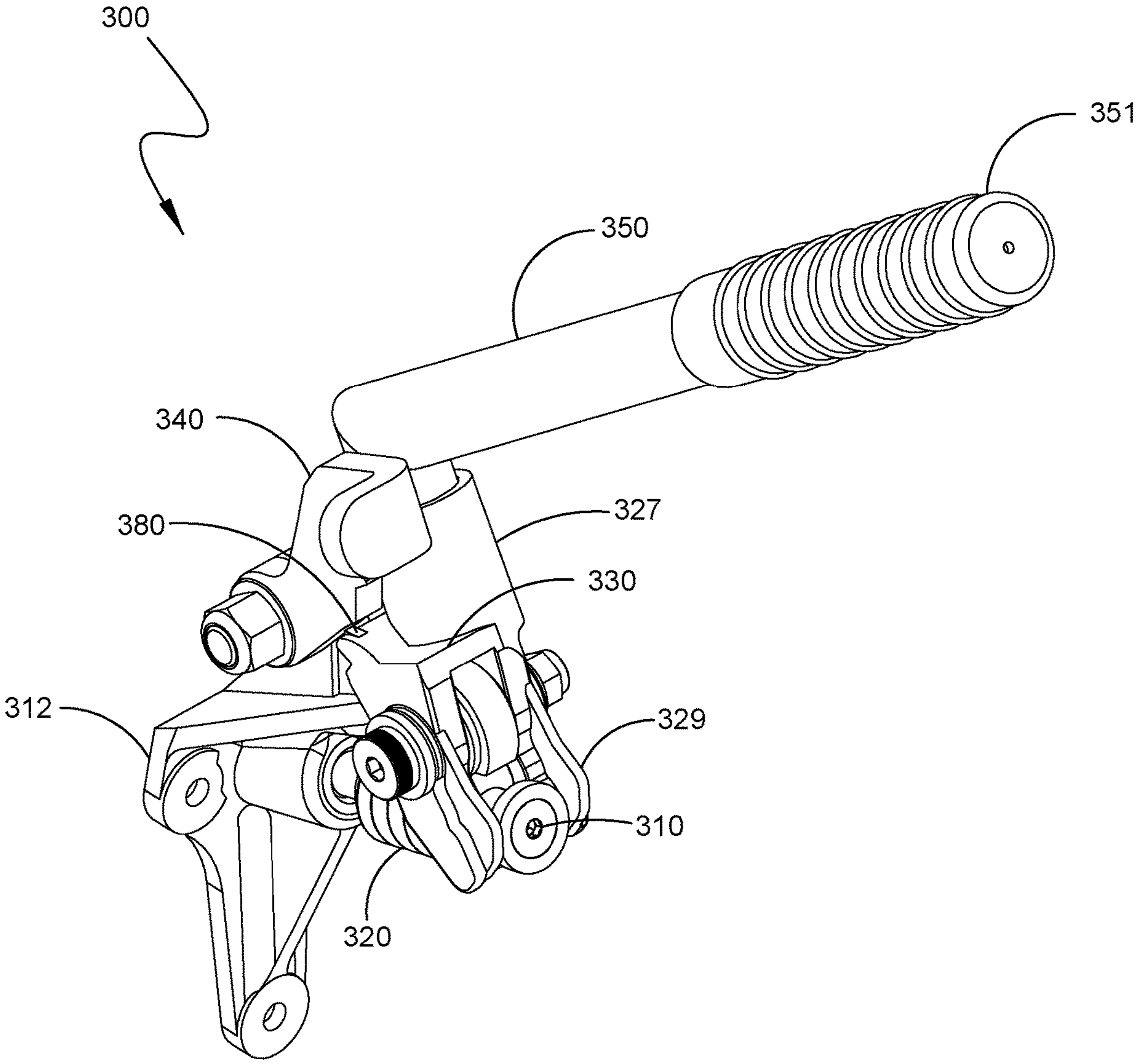
FIG. 12 is an isometric view of a compression assembly, according to an exemplary embodiment of the present disclosure.
Figure 12A:
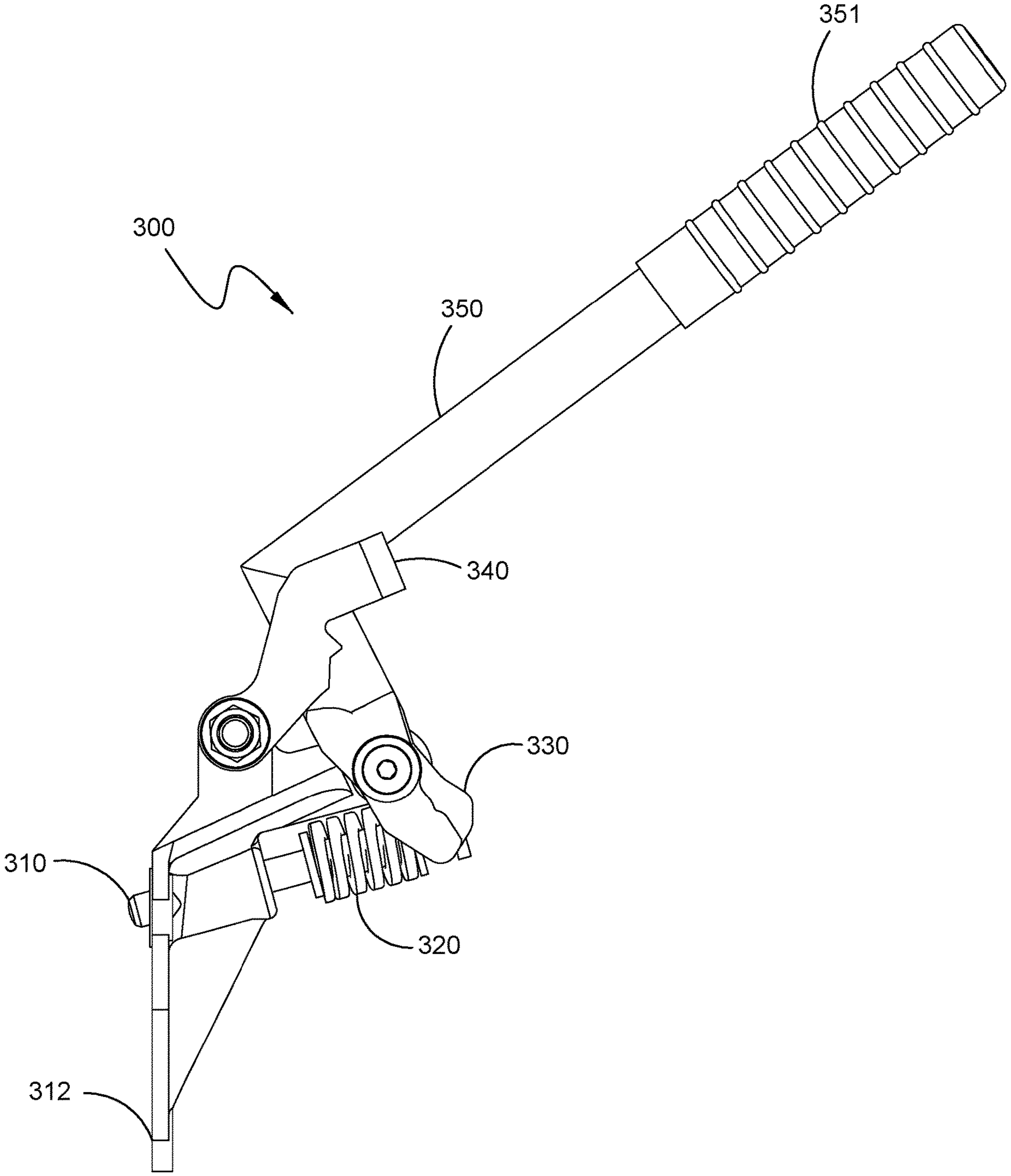
FIG. 12A is a side view of the compression assembly shown in FIG. 12.
Figure 13:
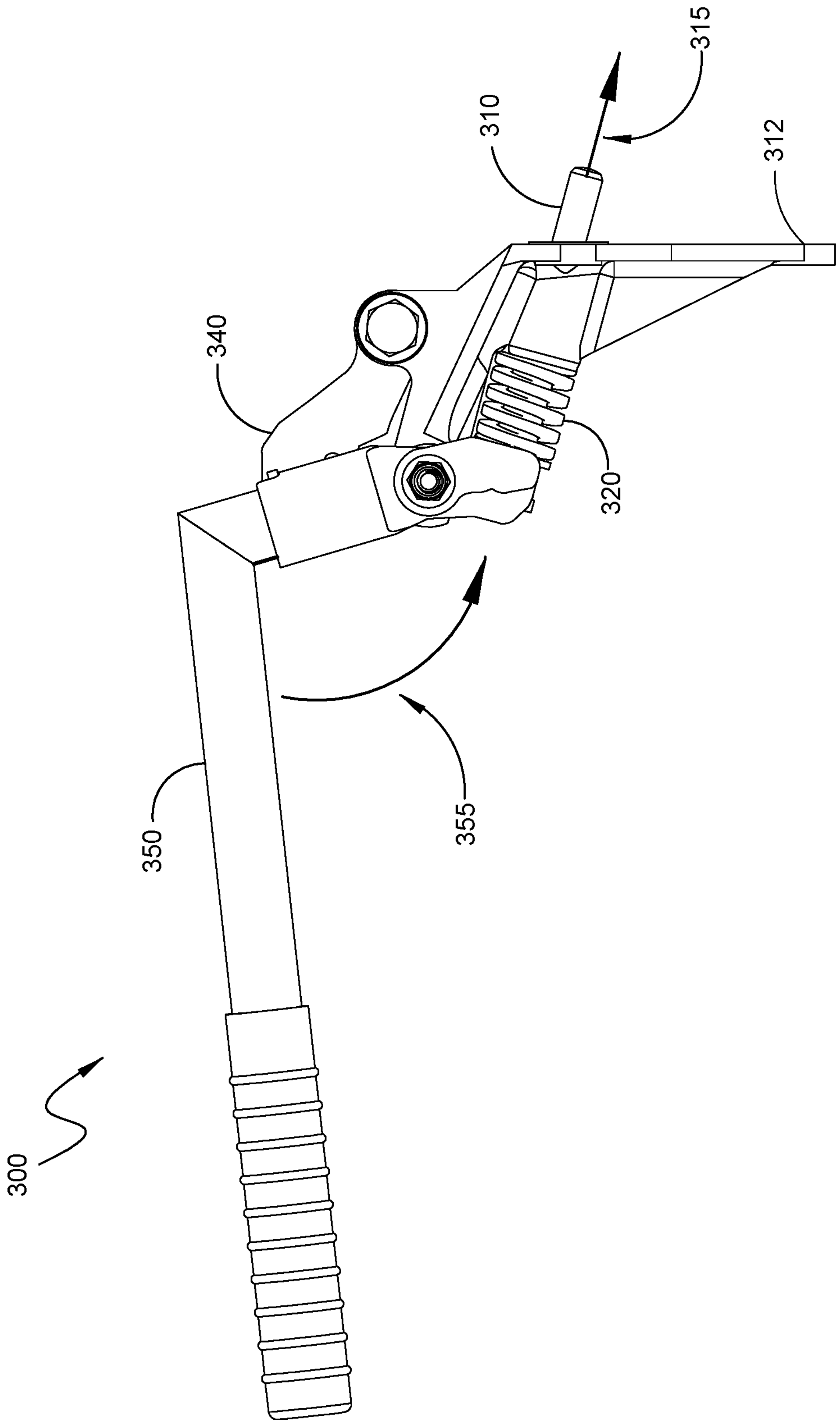
FIG. 13 is a side view of the compression assembly shown in FIG. 12 with the compression pin in an extended position.

Referring to FIGS. 12 to 13, compression assembly 300 is shown. Compression assembly 300 includes substantially the same features as compression assembly 100 described herein. However, compression assembly 300 does not include pinch guard 114. Compression assembly 300 has compression mounting bracket 312 which is configured to attach to a vibratory screening machine 10. Compression mounting bracket 312 may be bolted to a wall member 30, 40 of a vibratory screening machine 10. In exemplary embodiments, compression mounting bracket 312 is bolted to first wall member 30. Compression mounting bracket 312 may have a compression pin aperture allowing compression pin 310 to pass through. Compression mounting bracket 312 may be mounted with O-rings and a seal washer to ensure fluids do not pass through the wall member 30, 40 via compression assembly 300. Compression mounting bracket 312, O-rings and seal washer may all be flush with the wall member 30, 40 when mounted. Alternatively, compression mounting bracket 312 may be mounted to wall member 30, 40 via other attachment mechanisms.

Actuator bracket 330 may be attached to compression mounting bracket 312. See, e.g., FIG. 12. Attachment of actuator bracket 330 may be via a bolt connection such that actuator bracket 330 may rotate relative to the axis formed by the bolt connection. Although shown as a bolt connection, connection between actuator bracket 330 and compression mounting bracket 312 may be any secure connection allowing for rotation along the axis of the connection. Actuator bracket 330 attaches to compression pin 310 via extension members 329, which are secured to compression pin 310 just below pin head 310. Extension members 329 further contact compression spring 320, which is configured to push against extension members 329 and thereby push compression pin 310 away from the wall member 30, 40 of vibratory screening machine 10.

Figures 13A, 13B:
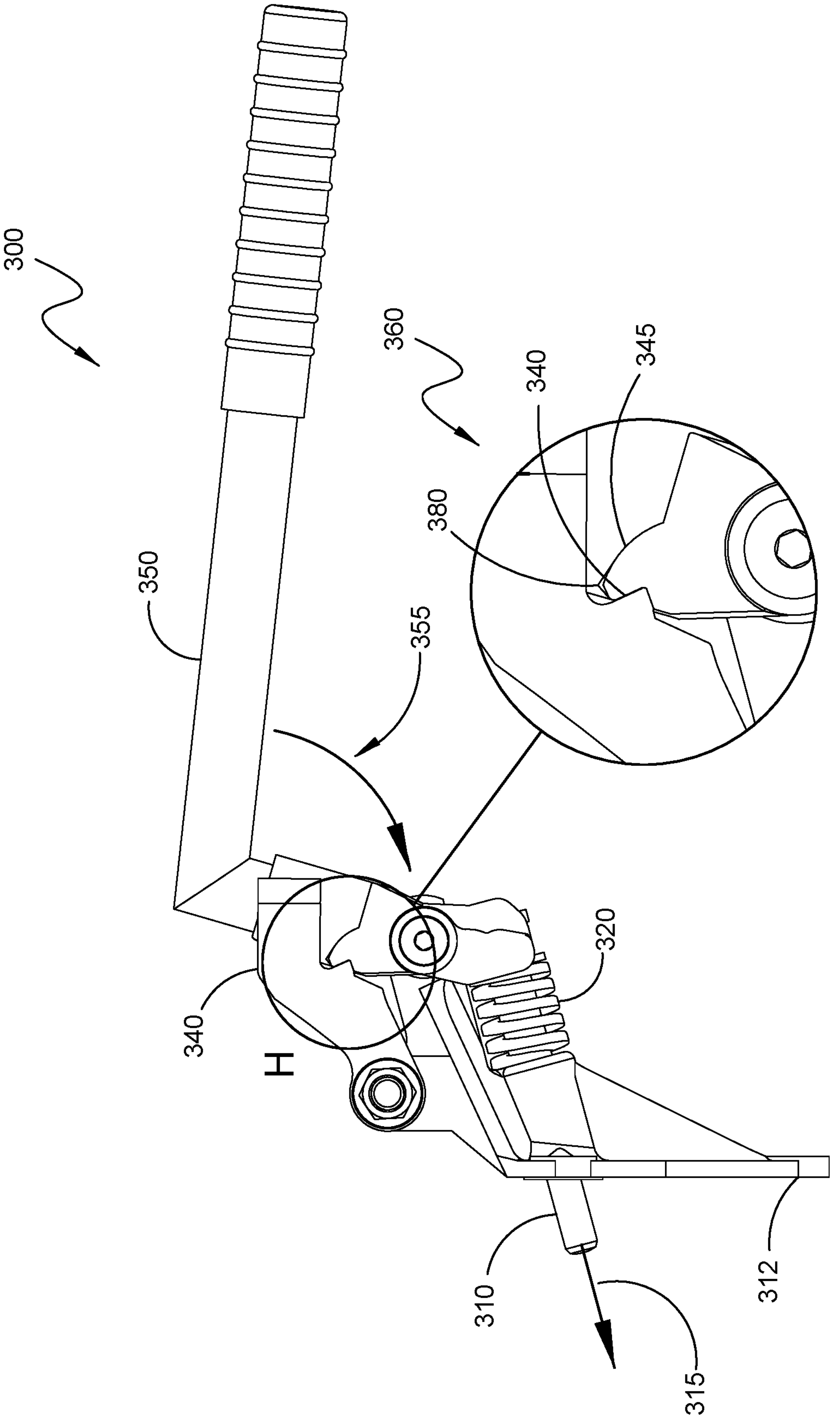
FIG. 13A is an opposite side view of the compression assembly shown in FIG. 13 in compression.
FIG. 13B is an enlarged view of Section H of the compression assembly shown in FIG. 13A.

Actuator bracket 330 further includes sleeve 327, which is configured to receive a first end of a handle 350. Handle 350 may be configured with a bend (see, e.g., FIG. 12) and include a second end having a grip 351. Downward force 355 may be applied to handle 350 to compress compression spring 320 via extension members 329 and push compression pin 310 in direction 315 to increase protrusion of compression pin 310 through the wall member 30, 40. See, e.g., FIG. 13. Compression assembly 300 may be locked into compression position 360 by engaging a locking latch 340 and locking pawl 345. See, e.g., FIGS. 13A and 13B. When downward force 355 is applied to handle 350, locking latch 340 falls until it engages pawl 345 in compression position 360. When in the compressed position 360, ends of extension members 329 may be aligned with face of compression pin 310. Compression assembly 300 may be released or unlocked by application of downward force 355 on handle 350 until locking latch 340 freely moves, lifting locking latch 340 so that actuator bracket 330 may rotate freely, reducing downward force 355 and releasing locking latch 340 once the actuator bracket 330 is no longer under sufficient compression to lock. Compression assemblies 300 of the present disclosure provide for quick installation and removal of screen assemblies 20 with reduced energy requirements and increased total compression force.

In embodiments, tattler 380 may be disposed between locking latch 340 and actuator bracket 330. See, e.g., FIGS. 12 and 13B. Tattler 380 may be a substantially rectangular shaped plate configured to act as an indicator of improper and/or loose attachment of compression assembly 300 to screen assembly 20 and/or vibratory screening machine 10. In some embodiments, when vibratory screening machine 10 is run with compression assembly 300 in an uncompressed state, locking latch 340 may freely vibrate/move against tattler 380 and wear down. See, e.g., FIG. 12. In this embodiment, when vibratory screening machine 10 is run with compression assembly 300 in a compressed state/compression position 360, locking latch 340 may be locked into place via pressure from the compression spring 320 and not wear down. See, e.g., FIG. 13B. Tattler 380 of embodiments of the present disclosure may therefore assist a user in ascertaining a potential cause of failure while running machine 10, for e.g., via improper attachment of the assembly 300 to the screen assembly 20 and/or machine 10.

Handle 350 may be detachably connected to sleeve 327 such that handle 350 may be used to activate and/or deactivate multiple compression assemblies 300. In some embodiments, sleeve 327 may include grooves configured to engage a locator pin of handle 350. The grooves and locator pin may allow handle 350 to be sufficiently secure within sleeve 327 while maintaining the ability for quick detachment.

Figure 14:
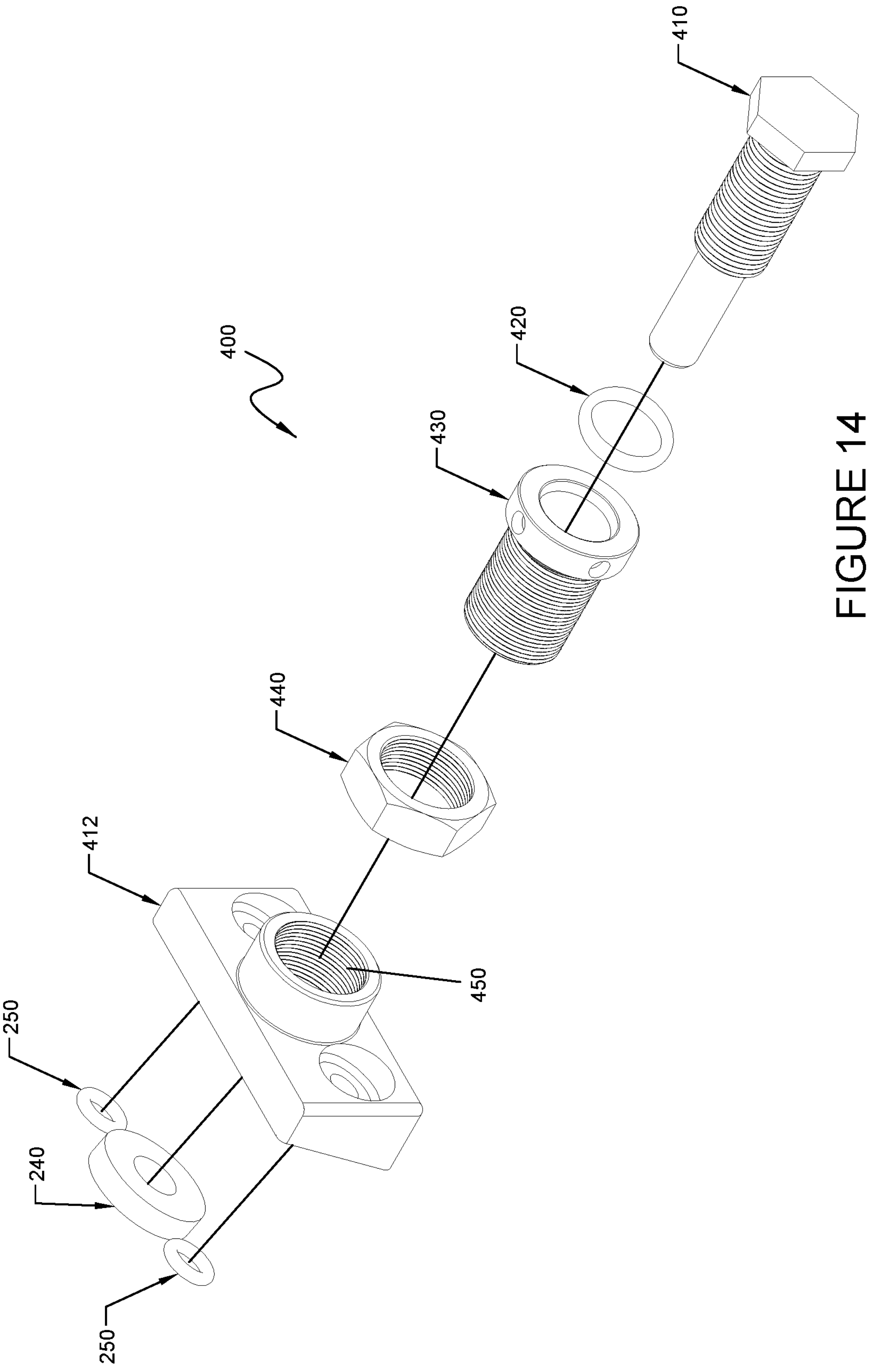
FIG. 14 is an exploded view of an adjustment pin assembly, according to an exemplary embodiment of the present disclosure.
Figure 15:
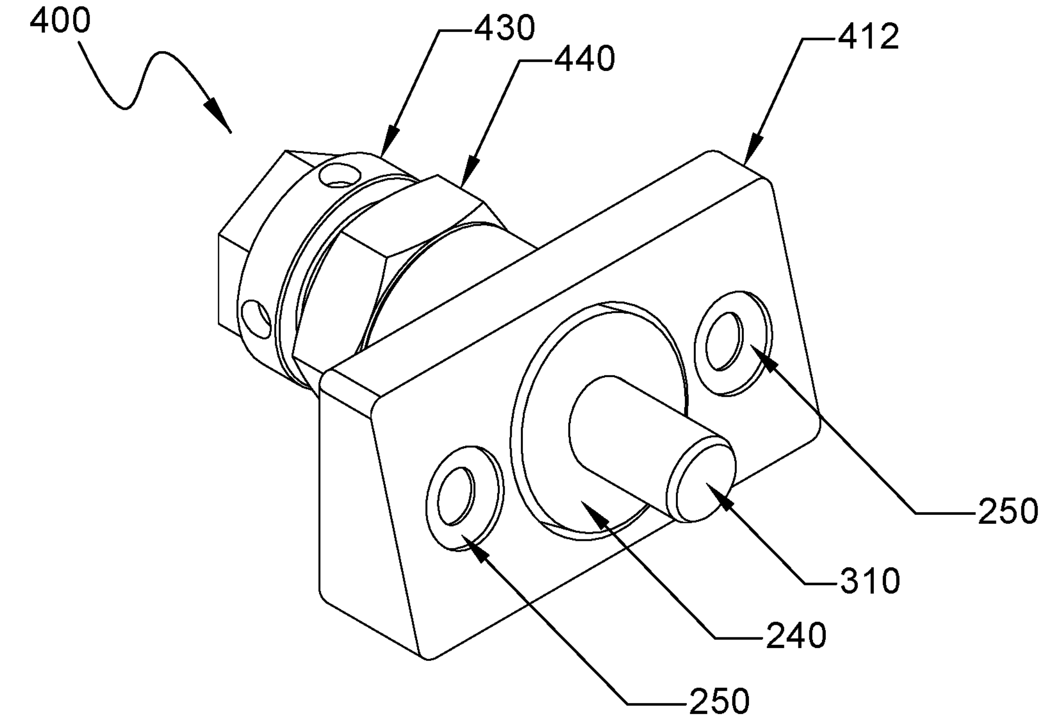
FIG. 15 is an isometric view of an adjustment pin assembly, according to an exemplary embodiment of the present disclosure.
Figure 15A:
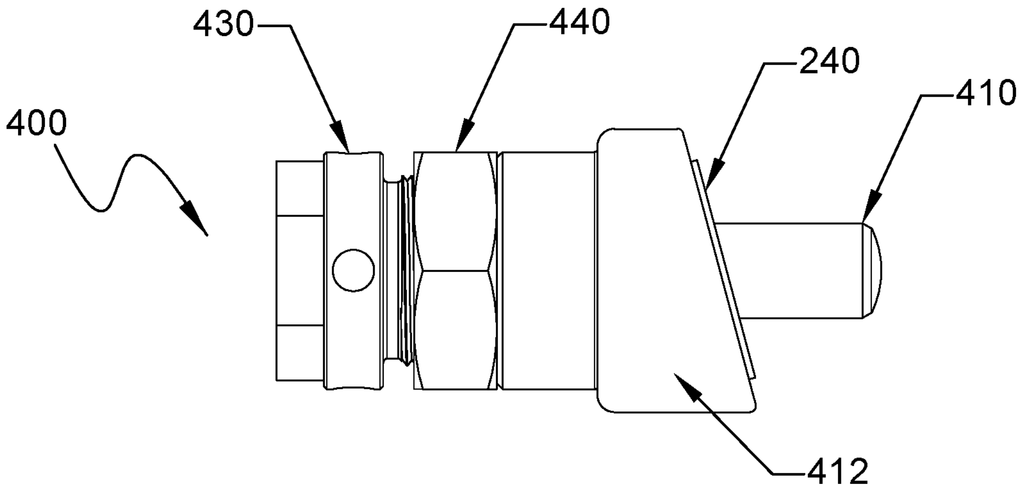
FIG. 15A is a side view of the adjustment pin assembly shown in FIG. 15.

Referring to FIGS. 14 to 15A, removable pin assembly 400 is shown. Removable pin assembly 400 includes a mounting block 412 which is configured to attach to a wall member 30, 40 of a vibratory screening machine 10. In an exemplary embodiment, mounting block 412 is attached to the second wall member 40. Mounting block 412 may be mounted with O-rings 250 and seal washer 240, which may all be flush with the wall member 30, 40 when mounted. Mounting block 412 may include a pin aperture located generally centrally and configured to allow pin 410 to pass through mounting block 412 from an end of removable pin assembly 400 external to vibratory screening machine 10, and configured to allow for seal washer 240 to tighten pin 410 onto mounting block 412 via an end of removable pin assembly 400 internal to vibratory screening machine 10. Mounting block 412 of removable pin assembly 400 may be bolted to vibratory screen assembly 20 and vibratory screening machine 10 via O-ring/mounting apertures located on either side of the pin aperture for insertion of O-rings 250. Alternatively, mounting block 412 of removable pin assembly 400 may be fixedly and/or permanently attached to vibratory screening machine 10 via other attachment mechanisms including welding, bolting, etc. In embodiments, pin 410 may include a variety of shapes, sizes, and configurations for use in removable pin assembly 400 and engagement with a screen assembly 20 of vibratory screening machine 10.

Pin aperture of mounting block 412 may have a threaded interior 450. See, e.g., FIG. 14. Pin 410 may be partially threaded at one end, which end may be fitted with a hex cap. Threaded end of pin 410 may be used to insert and attach pin 410 into a sleeve 430. The threading of pin 410 is configured to match threading in an interior of sleeve 430. Spring washer 420 may be disposed between pin 410 and sleeve 430 such that spring washer 430 interacts with one end of sleeve 430 and hex cap of pin 410 when pin 410 is attached to sleeve 430. See, e.g., FIGS. 15 and 15A. Lock nut 440 may be screwed and fully tightened onto a threaded exterior of sleeve 430. Threaded exterior of sleeve 430 may be inserted and screwed into threaded interior 450 of pin aperture of mounting block 412. Threaded exterior of sleeve 430 is configured to match with threaded interior of 450 of pin aperture. Pin 410, sleeve 430, lock nut 440 and/or pin aperture of mounting block 412 may include left-handed or right-handed threading. In some embodiments, pin 410 may be left-handed threaded to mate with threaded interior of sleeve 430. In this embodiment, threaded interior 450 of pin aperture of mounting block 412 and interior of lock nut 440 may be right-handed threaded to mate with threaded exterior of sleeve 430. In embodiments, threading of pin 410, interior and exterior of sleeve 430, interior of lock nut 440, and interior of pin aperture of mounting block 412 may all be configured such that the sleeve 430-nut 440-mounting block 412 connection will tighten when pin 410 is turned counterclockwise to remove and replace pin 410. In other instances, the sleeve 430-nut 440-mounting block 412 connection may tighten if pin 410 is turned clockwise to remove and replace pin 410.

Pin 410, spring washer 420, sleeve 430, and/or lock nut 440 may be inserted into threaded interior 450 of pin aperture of mounting block 412 such that non-threaded end of pin 410 may protrude through second wall member 40 and into vibratory screening machine 10. Once pin 410 is inserted into pin aperture to a desired level, pin 410 may be locked into place via tightening of hex cap of pin 410. In embodiments, no additional level of adjustment will be required once pin 410 is fully inserted and screwed into sleeve 430. In exemplary embodiments, the mounting block 412 may be fixedly and/or permanently attached to second wall member 40 of a vibratory screening machine 10 as described herein, and the pin 410 may be inserted, removed, and/or replaced as needed.

Embodiments of the present disclosure provide a method of installing and removing replaceable screens 20 of a vibratory screening machine 10. Screens and/or screen assemblies 20 may be placed into a vibratory screening machine 10 having compression assemblies 100, 300 and pin assemblies 200, 400 described herein. Compression assemblies 100, 300 may then be engaged via manual downward force 155 applied to a handle 150, 350 attached to a compression assembly 100, 300. Handle 150, 350 may be used for each of the compression assemblies 100, 300 to be activated. In some embodiments, adjustment pin assemblies 200 may be adjusted to ensure proper compression when the compression assemblies 100, 300 are engaged. In other embodiments, components of removable pin assemblies 400 may be fixedly and/or permanently attached to a wall member 30, 40 of a vibratory screening machine 10, and the pin 410 may be inserted, removed, and/or replaced as needed. To remove the pin 410 in the removable pin assembly 400, pin 410 may be turned clockwise or counterclockwise (depending on whether pin 410 includes left-handed or right-handed threading) to remove pin 410 from removable pin assembly 410. A new pin 410 may then be inserted and screwed into assembly 400 by turning pin in an opposite direction to the direction used to remove pin 410. To remove the screen and/or screen assembly 20, the downward force 155 is applied to each compression assembly 100, 300 until each may be unlocked, thereby allowing the screen 20 to be removed.

While the embodiments are described with reference to various implementations and exploitations, it will be understood that these embodiments are illustrative and that the scope of the disclosures is not limited to them. Many variations, modifications, additions, and improvements are possible, including removing and replacing items other than thrusters. Further still, any steps described herein may be carried out in any desired order, and any desired steps added or deleted.

What is claimed is:

1. A method for securing a screen assembly, comprising:

placing the screen assembly on a vibratory screening machine between a first wall and a second wall of the vibratory screening machine; and securing the screen assembly to the vibratory screening machine by:

rotating a first actuator of a first compression assembly about a first axis, wherein the first compression assembly is located along the first wall and wherein rotation of the first actuator about the first axis drives a first member against a first side portion of the screen assembly at a first position along a length of the screen assembly and drives a second side portion of the screen assembly towards an opposing surface.

2. The method of claim 1, wherein the screen assembly is secured to the vibratory screening machine by:

rotating a second actuator of a second compression assembly about a second axis, wherein the second compression assembly is located along the first wall and wherein rotation of the second actuator about the second axis drives a second member against the first side portion of the screen assembly at a second position along the length of the screen assembly and drives the second side portion towards the opposing surface.

3. The method of claim 2, wherein the first compression assembly and the second compression assembly are separately activated.

4. The method of claim 2, wherein rotating the first actuator and the second actuator comprises:

driving a first pin through the first wall into contact with the first side portion of the screen assembly, wherein the first pin forms the first member; and driving a second pin through the first wall into contact with the first side portion of the screen assembly, wherein the second pin forms the second member.

5. The method of claim 4, wherein driving the first pin or the second pin through the first wall comprises:

rotating a handle attached to a rearward portion of the first actuator or the second actuator, wherein rotating the handle advances or retracts the first pin or the second pin relative to the first wall.

6. The method of claim 5, further comprising:

locking the first pin or the second pin in an advanced position relative to the first wall.

7. The method of claim 2, further comprising:

driving the second side portion against a first pin of a first pin assembly attached to a second wall of the vibratory screening machine; and driving the second side portion against a second pin of a second pin assembly attached to the second wall of the vibratory screening machine.

8. The method of claim 7, further comprising:

adjusting a length of the first pin relative to the second wall; and adjusting a length of the second pin relative to the second wall.

9. The method of claim 2, wherein rotating the first actuator and the second actuator comprises:

applying compression across a width of the screen assembly between the first side portion and the second side portion.

10. The method of claim 2, wherein rotating the first actuator and the second actuator comprises:

deflecting the screen assembly from a first configuration to a second configuration.

11. The method of claim 10, wherein deflecting comprises:

deflecting the screen assembly from a generally flat configuration between the first side portion and the second side portion to a concave configuration between the first side portion and the second side portion.

12. The method of claim 10, wherein deflecting comprises:

deflecting the screen assembly from a first concave configuration between the first side portion and the second side portion to a second concave configuration between the first side portion and the second side portion.

13. A system, comprising:

a vibratory screening machine having a first wall and a second wall;

a screen assembly disposed between the first wall and the second wall of the vibratory screening machine; and a first compression assembly located along the first wall, the first compression assembly having a first rotating actuator that rotates about a first axis and which is connected to a rearward portion of a first compression member, wherein the first rotating actuator is configured to drive the first compression member against a first side portion of the screen assembly at a first position along a length of the screen assembly and drive a second side portion of the screen assembly in a direction away from the first wall.

14. The system of claim 13, further comprising:

a second compression assembly located along the first wall, the second compression assembly having a second rotating actuator that rotates about a second axis and which is connected to a rearward portion of a second compression member, wherein the second rotating actuator is configured to drive the second compression member against the first side portion of the screen assembly at a second position along the length of the screen assembly and drive the second side portion of the screen assembly in a direction away from the first wall.

15. The system of claim 14, wherein the first compression assembly and the second compression assembly are separately activatable to compress the screen assembly at the first and second positions.

16. The system of claim 14, wherein the first compression assembly comprises a first pin disposable through a first aperture in the first wall, wherein the first pin forms the first compression member, and the second compression assembly comprises a second pin disposable through a second aperture in the first wall, wherein the second pin forms the second compression member.

17. The system of claim 14, further comprising:

a first pin assembly located along the second wall opposite of the first compression assembly; and a second pin assembly located along the second wall opposite of the second compression assembly.

18. The system of claim 17, wherein the first pin assembly comprises a first pin that extends from the second wall and the second pin assembly comprises a second pin that extends for the second wall.

19. The system of claim 17, wherein the first pin and the second pin are adjustable.

20. The system of claim 17, wherein the first pin and the second pin are fixed relative to the second wall.

21. The system of claim 14, wherein each of the first compression assembly and the second compression assembly comprises:

a compression mounting bracket attached to the first wall, wherein the rotating actuator is pivotally mounted to the compression mounting bracket; and extension members extending between the rotating actuator and the compression member;

wherein the extension members are configured to push the compression member in a direction away from the first wall when the rotating actuator is rotated.

22. The system of claim 21, wherein the rotating actuator includes a sleeve configured to receive a first end of a detachable handle.

23. The system of claim 22, wherein each compression assembly is configured such that a downward force can be applied to the handle to lock the compression assembly in a locked position.

24. The system of claim 23, wherein each compression assembly further comprises:

a locking latch and a locking pawl.

* * * * *